(12) United States Patent
Kim et al.

(10) Patent No.: US 11,733,962 B2
(45) Date of Patent: Aug. 22, 2023

(54) APPARATUS AND METHOD FOR CONVERTING AUDIO OUTPUT

(71) Applicant: Samsung Electronics Co., Ltd., Gyeonggi-do (KR)

(72) Inventors: Byeongnam Kim, Gyeonggi-do (KR); Chanyong Jung, Gyeonggi-do (KR); Sangheon Kim, Gyeonggi-do (KR); Misun Kim, Gyeonggi-do (KR); Mira Seo, Gyeonggi-do (KR); Yeunwook Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 17/152,915

(22) Filed: Jan. 20, 2021

(65) Prior Publication Data
US 2021/0247952 A1    Aug. 12, 2021

(30) Foreign Application Priority Data

Feb. 10, 2020  (KR) .................. 10-2020-0015945

(51) Int. Cl.
G06F 3/16      (2006.01)
H04R 5/04      (2006.01)
H04R 3/12      (2006.01)

(52) U.S. Cl.
CPC ............... *G06F 3/165* (2013.01); *H04R 3/12* (2013.01); *H04R 5/04* (2013.01); *H04R 2227/005* (2013.01); *H04R 2420/07* (2013.01); *H04R 2430/01* (2013.01)

(58) Field of Classification Search
CPC .. G06F 3/165; H04R 3/12; H04R 5/04; H04R 2227/005; H04R 2420/07; H04R 2430/01
See application file for complete search history.

(56) References Cited

U.S. PATENT DOCUMENTS

| 8,320,586 B2 * | 11/2012 | Shen ..................... H04R 29/001 381/74 |
| 2005/0265565 A1 * | 12/2005 | Sakemoto ................ H04B 3/56 381/77 |
| 2007/0142942 A1 * | 6/2007 | Hyatt ................ H04M 1/72409 381/74 |

(Continued)

FOREIGN PATENT DOCUMENTS

| JP | 2004-128812 A | 4/2004 |
| JP | 2007-006432 A | 1/2007 |

(Continued)

OTHER PUBLICATIONS

International Search Report dated Apr. 29, 2021.
European Search Report dated Jun. 7, 2023.

*Primary Examiner* — Joseph Saunders, Jr.
(74) *Attorney, Agent, or Firm* — Cha & Reiter, LLC

(57) ABSTRACT

Provided is an apparatus that includes a speaker, a memory, and a processor operatively connected to the speaker and the memory. The processor is configured to: identify whether audio output is provided via the speaker when an external device is detected; determine, based on whether the audio is output via the speaker, whether to apply output conversion effects; and control, based on the determination, the audio output via the external device. Various other embodiments including a method thereof are also possible.

19 Claims, 17 Drawing Sheets

(56) References Cited

U.S. PATENT DOCUMENTS

| | | |
|---|---|---|
| 2008/0123868 A1 | 5/2008 | McCarty et al. |
| 2008/0240461 A1* | 10/2008 | Nakamura ............. H04R 5/023 |
| | | 381/81 |
| 2012/0027215 A1 | 2/2012 | Sim et al. |
| 2013/0129109 A1 | 5/2013 | Jung |
| 2013/0156228 A1 | 6/2013 | Katayama et al. |
| 2013/0286522 A1 | 10/2013 | Mullins et al. |
| 2016/0112792 A1 | 4/2016 | Lee et al. |
| 2017/0048619 A1 | 2/2017 | Bang et al. |
| 2021/0160618 A1 | 5/2021 | Chun et al. |

FOREIGN PATENT DOCUMENTS

| | | |
|---|---|---|
| KR | 10-2016-0045463 A | 4/2016 |
| KR | 20-2019-0001623 U | 6/2019 |
| KR | 10-2020-0000268 A | 1/2020 |

\* cited by examiner (610)

(630)

(650)

(670)

(750)

(770)

APPARATUS AND METHOD FOR CONVERTING AUDIO OUTPUT

CROSS-REFERENCE TO RELATED APPLICATION(S)

This application is based on and claims priority under 35 U.S.C. 119 to Korean Patent Application No. 10-2020-0015945, filed on Feb. 10, 2020, in the Korean Intellectual Property Office, the disclosure of which is herein incorporated by reference in its entirety.

BACKGROUND

1) Field

One or more embodiments of the instant disclosure generally relate to an audio output conversion method and an apparatus therefor.

2) Description of Related Art

Recently, with the development of digital technologies, various types of electronic devices are being widely utilized, such as mobile communication terminals, personal digital assistants (PDA), electronic organizers, smart phones, tablet personal computers (PC), wearable devices, and the like. Further, hardware and/or software components of the electronic devices have been continuously improved in order to support the increasing number of functions implemented in the electronic devices.

Users may reproduce music (e.g., audio data) using an electronic device, or may reproduce a movie or a TV show (e.g., video data). An electronic device may output sound (or audio data) in a mono scheme or stereo scheme. The mono scheme may be a scheme that uses a single channel to compose sound or outputs the same sound via two different speakers. The stereo scheme may be a scheme that uses at least two channels to compose sound and outputs different sounds via the respective audio channels, or outputs different sounds via at least two speakers. In the case in which sound is output in the stereo scheme, users may feel a sense of space or a sense of direction of the outputted sound.

The above information is presented as background information only to assist with an understanding of the disclosure. No determination has been made, and no assertion is made, as to whether any of the above might be applicable as prior art with regard to the disclosure.

SUMMARY

While an electronic device is outputting sound, if an external device (e.g., earphones or an external speaker) is connected, noise (e.g., popping noise) may be produced due to the connection of the device. Alternatively, if the electronic device is connected to an external device wirelessly, a popping noise may be continuously produced while the electronic device is outputting sound to the external device. Alternatively, if sound is output via an external device before the electronic device obtains profile information (e.g., audio/video remote control profile (AVRCP)) of the external electronic device, there may be an issue associated with volume (e.g., sound may be output unexpectedly at a high volume).

In accordance with an aspect of the disclosure, an electronic device, may include: a speaker; a memory; and a processor operatively connected to the speaker and the memory, wherein the processor is configured to: identify whether audio output via the speaker is performed when an external device is detected; determine, based on whether the audio is output via the speaker, whether to apply output conversion effects; and control, based on the determination, the audio output via the external device.

In accordance with an aspect of the disclosure, an operation method of an electronic device may include: detecting an external device; identifying a connection type of the detected external device; identifying whether audio is output via a speaker of the electronic device; determining whether to apply output conversion effects based on the connection type of the detected external device and/or whether the audio is output via the speaker; and controlling audio output via the external device based on the determination.

Additional aspects will be set forth in part in the description which follows and, in part, will be apparent from the description, or may be learned by practice of the presented embodiments.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
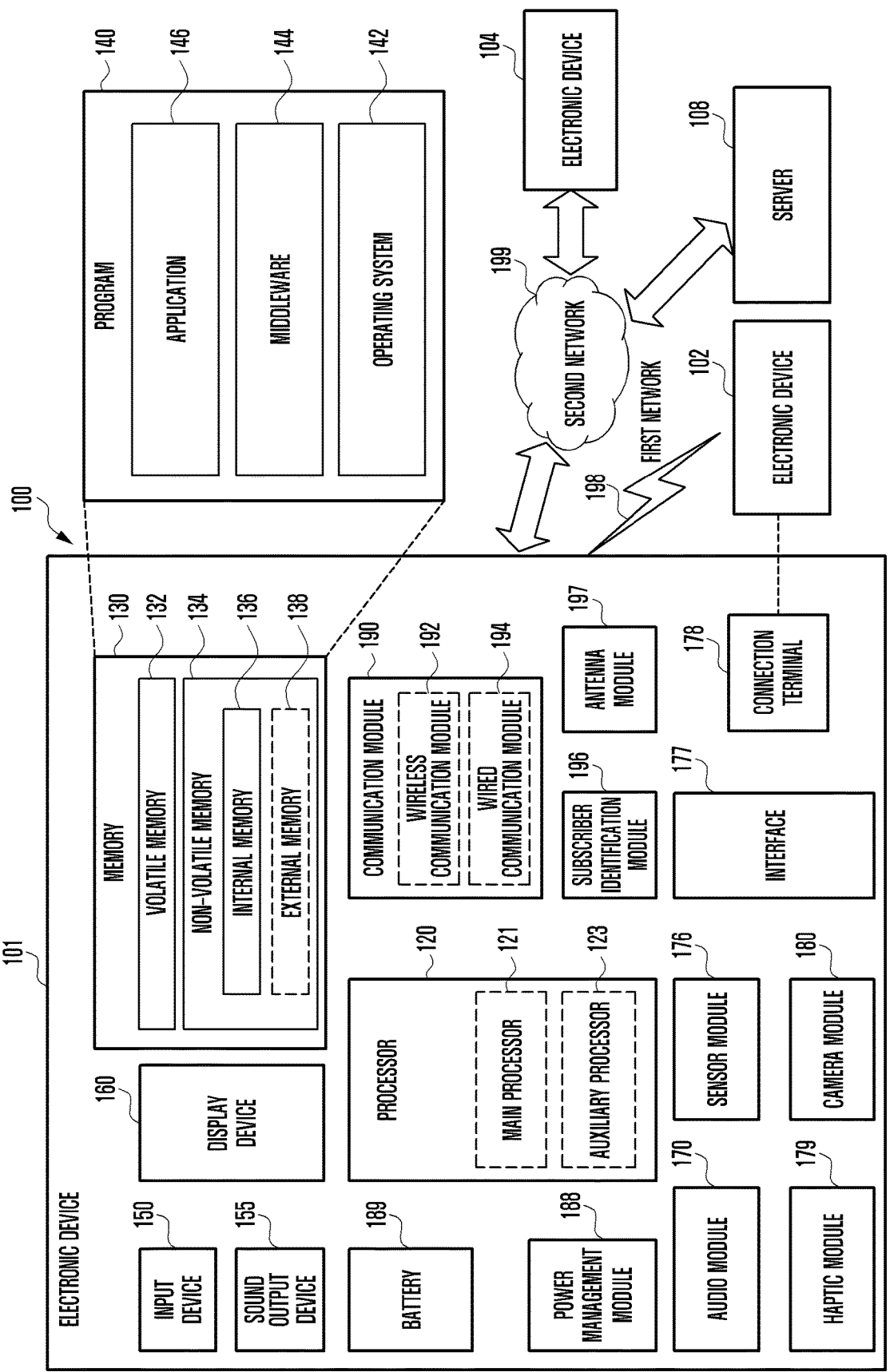
FIG. 1 is a block diagram illustrating an electronic device in a network environment according to an embodiment.

According to certain embodiments, there is provided a method and apparatus for applying fade-in effects or fade-out effects to output sound when audio output conversion is performed (e.g., when an external device is connected while an electronic device is outputting sound, or when a second external device is connected while a first external device is outputting sound).

According to certain embodiments, output conversion effects (e.g., fade-in effects, fade-out effects) are applied to output sound when audio output conversion is performed (e.g., when an external device is connected while an electronic device is outputting sound, or when a second external device is connected while a first external device is outputting sound), and thus, the occurrence of popping noises may be reduced, and audio sound may be prevented from being output unexpectedly at a high volume.

According to certain embodiments, inconvenience for the user, caused by sound volume-related issues that occur when an audio output device is changed, may be removed by applying output conversion effects.

According to certain embodiments, when fade-in effects or fade-out effects are applied, output directionality may be controlled so that the user may feel stereo audio output effects (e.g., 3D effect).

For example, according to certain embodiments, output directionality of the fade-in effects may be controlled so that the user may feel that sound output is getting closer.

In another example, according to certain embodiments, output directionality of the fade-out effects may be controlled so that the user may feel that sound output is getting farther away.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combinations thereof and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
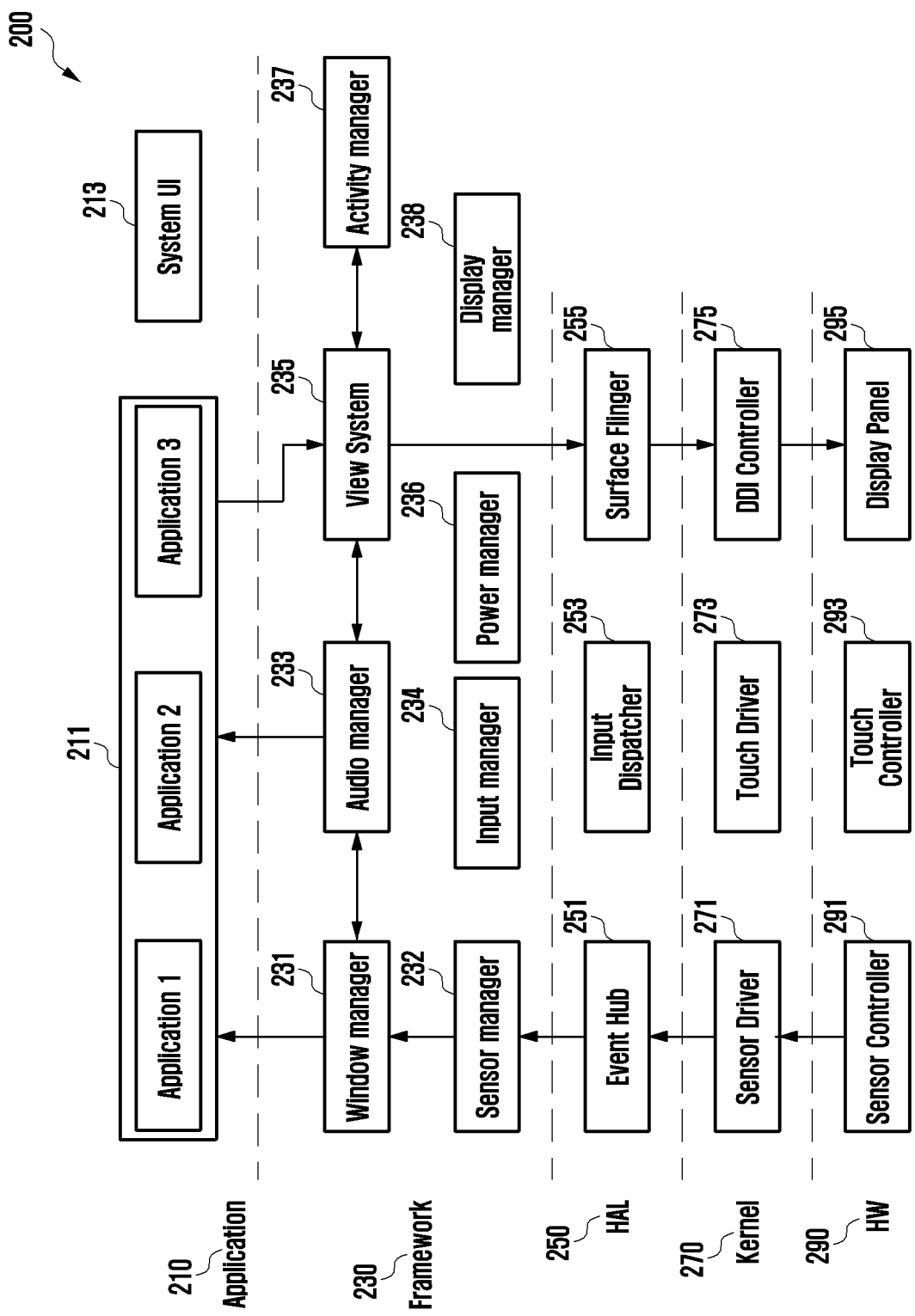
FIG. 2 is a block diagram illustrating a program module of an electronic device according to an embodiment.

FIG. 2 is a block diagram illustrating a program module 200 of an electronic device according to an embodiment.

Referring to FIG. 2, an electronic device (e.g., the electronic device 101 of FIG. 1) may include an operating system (OS) (e.g., the operating system 142 of FIG. 1) that controls resources of the electronic device 101 and/or the program module 200 that includes various applications running in the operating system. The operating system 142 may be, for example, Android™, iOS™, Windows™, Symbian™, Tizen™, Bada™, or the like. FIG. 2 illustrates the program module 200 that supports an audio output conversion function in the electronic device 101 operating based on the Android™ operating system.

The program module 200 may include an application 210, a framework 230, a hardware abstraction layer (HAL) 250, a kernel 270, or hardware (HW) 290. At least some of the program module 200 may be preloaded on the electronic device 101, or may be downloaded from an external electronic device (e.g., the electronic device 102 or 104, or the server 106). The application 210 may include at least one application 211 (e.g., application 1, application 2, and application 3) and a system UI 213 which are stored in a memory (e.g., the memory 130 of FIG. 1) and may be executable by a processor (e.g., the processor 120 of FIG. 1). The application 210 may include applications such as internet browser, video application, game application, and the like, and the application type thereof is not limited. The system UI 213 may be an application that configures various graphical user interface (GUI) screens implemented in the system of the electronic device 101 such as a notification bar, quick view panes, or the like.

The framework 230 may provide various functions to the application 210 so that functions or information provided from one or more resources of the electronic device 101 may be used by the application 210. The framework 230 may include a window manager 231, a sensor manager 232, an audio manager 233, an input manager 234, a view system 235, a power manager 236, an activity manager 237, or a display manager 238. The window manager 231 may manage one or more GUI resources used in the screen of the electronic device 101. For example, the window manager 231 may detect a change of the state of the electronic device 101 via a sensor (e.g., the sensor module 176 of FIG. 1), and may transfer information associated with a display area corresponding to the state of the electronic device 101 to the application 210. For example, if the change of the state of the electronic device 101 is identified, the window manager 231 may transfer information associated with a display area corresponding to the changed state of the electronic device 101 to an application to which continuity is set among the at least one application 211 that is being executed. The sensor manager 232 may perform control based on the information obtained from a sensor (e.g., the sensor module 176 of FIG. 1).

The audio manager 233 may transfer control information associated with audio output to an application associated with audio output among the at least one application 211 that is being executed in the electronic device 101. For example, the audio manager 233 may control a function associated with audio output conversion, and if an external device is connected to the electronic device 101, the audio manager 233 may record the connection time (or connection time information) or the output start time (or output time information) of the external device in the memory 130. The audio manager 233 may match volume control information (e.g., absolute volume control (AVC)) to the identifier (e.g., MAC address) of the external device, and may store the same in the memory 130. Based on the volume control information of the external device, the audio manager 233 may determine whether to apply output conversion effects to audio output.

The input manager 234 may provide information associated with an input device (e.g., the input device 150 of FIG. 1) of the electronic device 101. The view system 235 may be a set of extendable views used for producing a user interface of the application 210. The power manager 236 may manage the capacity, temperature, or power of the battery of the electronic device 101, and may determine or provide information needed for operating the electronic device 101 using the battery information. The activity manager 237 may control the lifecycle and the activity stack of the application 210. The display manager 238 may manage the lifecycle (e.g., connection, change of an attribute, or removal) of a display (e.g., the display device 160 of FIG. 1) of the electronic device 101, and may manage hardware display mapping when outputting a screen GUI element. For example, if the electronic device 101 is a foldable device, the display manager 238 may change a display to be output based on a system event, such as a change of the folded state of the electronic device 101.

The hardware abstraction layer 250 may be an abstraction layer between a plurality of hardware modules included in the hardware 290 and the software of the electronic device 101. The hardware abstraction layer 250 may include an event hub 251, an input dispatcher 253, and/or surface flinger 255. The event hub 251 may provide an interface that standardizes events occurring in the sensor module 176. The input dispatcher 253 may determine an application to which an occurred event is to be provided, among the at least one application 211. The surface flinger 255 may select an execution screen to be displayed on the display device 160 among the various execution screens produced in the at least one application 211, and may request the application 210 to process changing of resolution and density according to changed display configuration when the display configuration is changed.

The kernel 270 may include various drivers for controlling various hardware modules included in the electronic device 101. The kernel 270 may include a sensor driver 271, a touch driver 273, or a display driver integrated circuit (DDI) controller 275. The sensor driver 271 may be an interface module that controls a sensor controller 291 connected to the sensor module 176. The touch driver 273 may be an interface module that controls a touch controller 293. The DDI controller 275 may be an interface module that controls a display driver integrated circuit (DDI).

The hardware 290 may include a sensor controller 291, a touch controller 293, or a display panel 295. The sensor controller 291 may include a hall sensor for sensing a folding state of the electronic device 101, if the electronic device 101 is a foldable device. The touch controller 293 may control a touch sensor for receiving touch input on the display device 160. The display panel 295 may be the display device 160.

An electronic device (e.g., the electronic device 101 of FIG. 1) according to an embodiment may include a speaker (e.g., the sound output device 155 of FIG. 1), a memory (e.g., the memory 130 of FIG. 1), and a processor (e.g., the processor 120 of FIG. 1) operatively connected to the speaker and the memory, and the processor may be configured to: identify whether audio output via the speaker is performed when an external device is detected; determine, based on whether the audio is output via the speaker, whether to apply output conversion effects; and control, based on the determination, the audio output via the external device. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The processor may be configured to: determine to apply the output conversion effects when the external device is detected while the audio is output via the speaker; and determine not to apply the output conversion effects when the external device is detected while the audio is not output via the speaker.

The processor may be configured to: identify a connection type of the detected external device; when the external device is a wired device, determine whether to apply the output conversion effects based on whether the audio is output via the speaker; and when the external device is a wireless device, obtain volume control information from the external device and determine whether to apply the output conversion effects based on the volume control information or whether the audio is output via the speaker.

The processor may be configured to: when the external device is the wireless device, store a connection time or an output start time of the external device in the memory; and when the volume control information is not obtained before the output start time, determine not to apply the output conversion effects.

The processor may be configured to apply fade-in effects to the audio output via the external device based on the output start time when it is determined that the output conversion effects is to be applied.

To apply the fade-in effects, the processor may be configured to change volume of the audio gradually from a lowest volume to a highest volume or to a predetermined volume.

The processor may be configured to apply fade-out effects to the audio output via the speaker based on the connection time, and to apply fade-in effects to the audio output via the external device based on the output start time when it is determined that the output conversion effects is to be applied.

To apply the fade-out effects, the processor may be configured to change the volume of the audio gradually from a highest volume or to a predetermined volume to a lowest volume.

The processor may be configured to: apply the fade-in effects for a predetermined period of time after applying the fade-out effects; or apply the fade-in effects immediately after applying the fade-out effects.

The processor may be configured to: when the volume control information is not obtained before the output start time from the external device while the audio is output via the speaker, suspend audio output via the speaker; and transmit audio data to the external device without applying the output conversion effects to the audio to be output via the external device.

The processor is configured to: store an output adjustment object of the electronic device in the memory as a first output adjustment object, produce an output adjustment object of the external device when the processor is connected to the wireless device; store the output adjustment object in the memory as a second output adjustment object; and apply the output conversion effects to the audio outputted via the speaker using the first output adjustment object, or apply the output conversion effects to the audio outputted via the external device using the second output adjustment object.

The processor may be configured to: detect another external device while the audio is output via the external device; identify an output control time of the external device or the other external device; and determine whether to apply the output conversion effects based on the output control time.

The output control time may include an output end time of the external device and/or an output start time of the other external device, and the processor may be configured to: determine to apply the output conversion effects when the output start time falls within a predetermined period of time from the output end time; and determine not to apply the output conversion effects when the output start time is beyond the predetermined period of time from the output end time.

The processor may be configured to: when the processor is connected to the other external device, store a connection time and/or the output start time of the other external device in the memory; when it is determined to apply the output conversion effects, apply fade-out effects to the audio output via the external device based on the output end time and/or the connection time; and apply fade-in effects to the audio output via the other external device, based on the output end time and/or the output start time.

The processor may be configured to: apply the fade-in effects for another predetermined period of time after applying the fade-out effects; apply the fade-in effects immediately after applying the fade-out effects; or partially overlap an interval for applying the fade-out effects and an interval for applying the fade-in effects.

The processor may be configured to: when the external device is configured with at least a first device and a second device, apply the fade-out effects to the first device at the connection time, and apply the fade-out effects to the second device for another predetermined period of time after the connection time.

The processor may be configured to: when the other external device is configured with at least a third device and a fourth device, apply the fade-in effects to the third device at the output start time, and apply the fade-in effects to the fourth device for another predetermined period of time after the output start time.

The processor may be configured to: store an output adjustment object of the electronic device in the memory as a first output adjustment object; produce an output adjustment object of the external device when the processor is connected to the external device; store the output adjustment object of the external device in the memory as a second output adjustment object; produce an output adjustment object of the other external device when the processor is connected to the other external device; store the output adjustment object of the other external device in the memory as a third output adjustment object; and apply the output conversion effects to the audio outputted via the external device using the second output adjustment object, or apply the output conversion effects to the audio outputted via the other external device using the third output adjustment object.

Figure 3A:
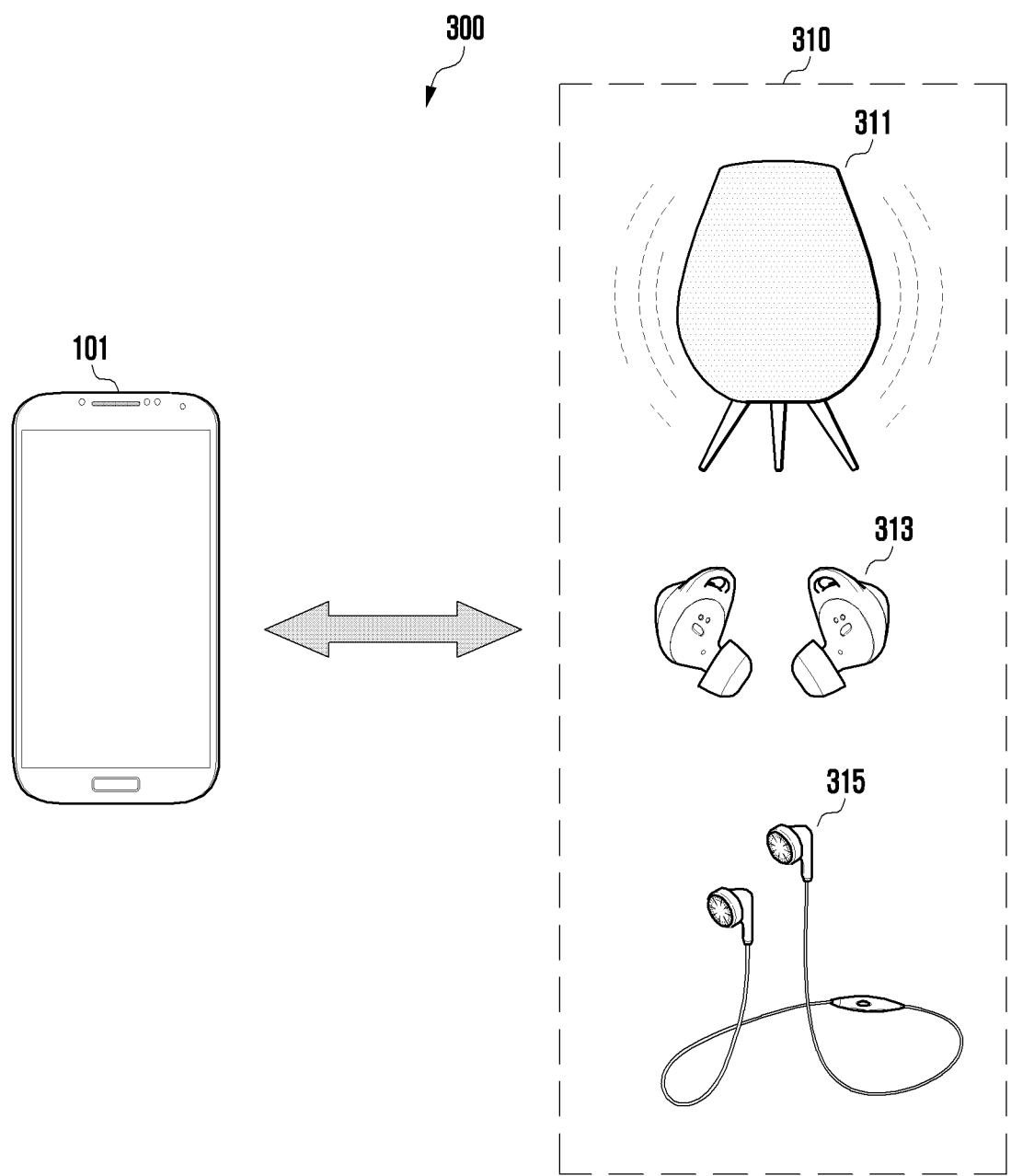
FIG. 3A is a diagram illustrating the connection relationship between an electronic device and an external device according to an embodiment.
Figure 3B:
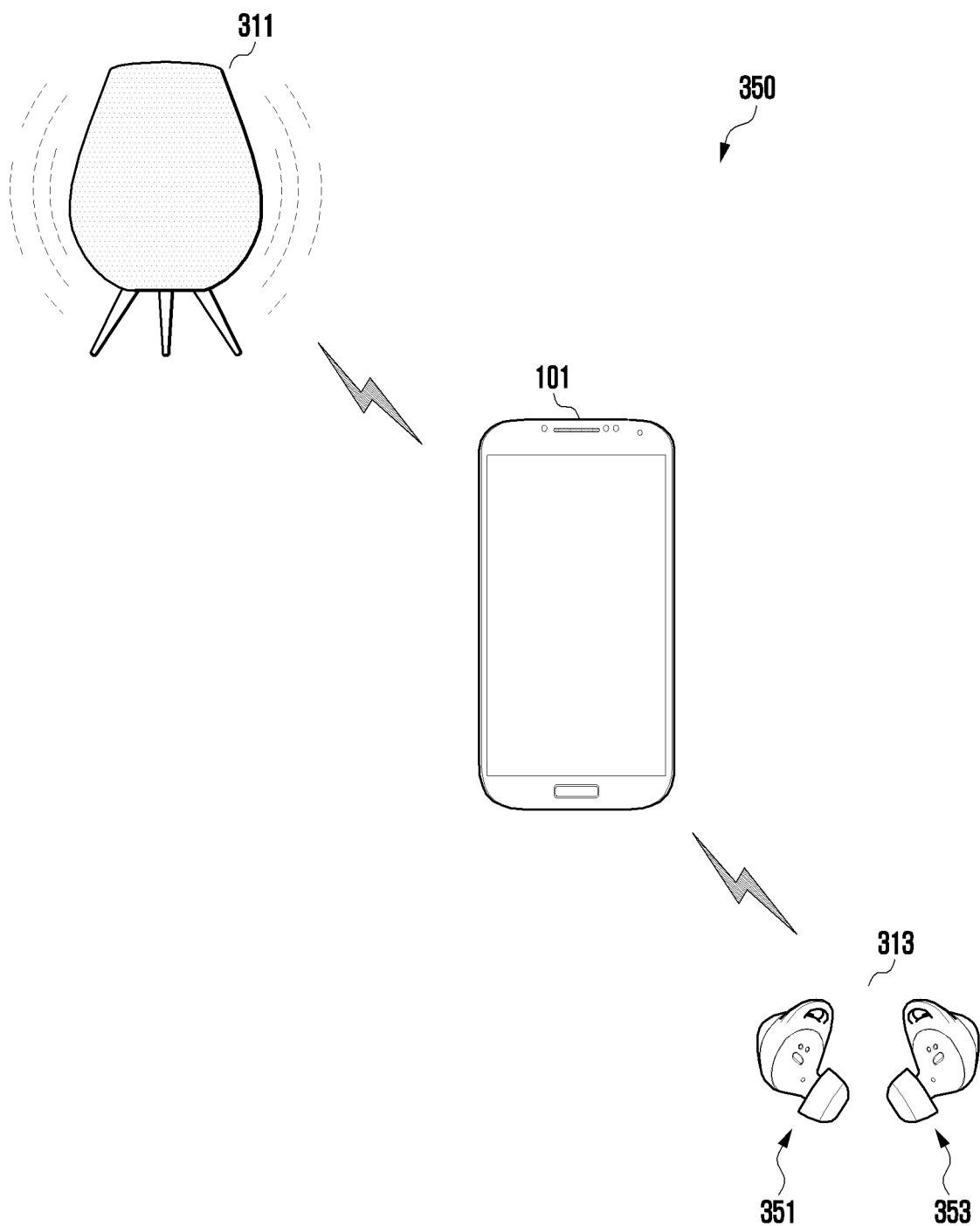
FIG. 3B is a diagram illustrating the connection relationship between an electronic device and an external device according to another embodiment.

FIG. 3A is a diagram illustrating the connection relationship between an electronic device and an external device according to an embodiment, and FIG. 3B is a diagram illustrating the connection relationship between an electronic device and an external device according to another embodiment.

FIG. 3A is a diagram illustrating a connection relationship 300 between an electronic device and at least one external device.

Referring to FIG. 3A, an electronic device (e.g., the electronic device 101 of FIG. 1) according to an embodiment may detect an external device 310, and may connect to the external device 310. The external device 310 may include wired and wireless devices, and may output audio data received from the electronic device 101. For example, the first external device 311 may be a speaker (e.g., a Bluetooth speaker), a second external device 313 may be wireless earphones, and a third external device 315 may be wired earphones. The above-description is merely provided to help understanding of the disclosure, and the disclosure is not limited thereto.

If the electronic device 101 is connected to the external device 310, the electronic device 101 may store (or record) the connection time of the external device 310 or the output start time of the external device 310 in a memory (e.g., the memory 130 of FIG. 1). The connection time may be the point in time at which the electronic device 101 is connected to the external device 310, and the output start time may be the point in time at which audio output via the external device 310 is enabled. The electronic device 101 may identify whether audio output is provided, and may identify volume control information of the external device 310 (e.g., the first external device 311 or the second external device 313). Based on whether audio output is provided or the volume control information, the electronic device 101 may determine whether to apply output conversion effects. The volume control information may include information regarding whether to take charge of volume adjustment. The volume control information may be set to activation (or turning on) of the volume adjustment or deactivation (or turning off) of the volume adjustment. The output conversion effects may be fade-in effects or fade-out effects, and may be applied according to a change of an audio output device. The fade-in effects may be changing the volume of audio output to be gradually higher (e.g., gradually increase the volume), and the fade-out effects may be changing the volume of audio output to be gradually lower (e.g., gradually decrease the volume).

According to an embodiment, the electronic device 101 may not identify the volume control information of the external device 310 depending on the connection type of the external device 310. If the connection type of the external device 310 is wireless, such as the first external device 311 or the second external device 313, the electronic device 101 may identify volume control information. If the connection type of the external device 310 is wired such as the third external device 315, the electronic device 101 may not identify the volume control information. Based on whether audio output is provided via a speaker of the electronic device 101 itself (e.g., the sound output device 155) at the point in time at which the third external device 315 is connected, the electronic device 101 may determine whether to apply output conversion effects. For example, if audio output is not provided at the point in time at which the connection to the third external device 315 is detected, the electronic device 101 may not apply output conversion effects. If the third external device 315 is connected while audio output is being provided via the sound output device 155, the electronic device 101 may apply output conversion effects. If audio output is not provided at the point in time at which the connection to the first external device 311 or the second external device 313 is detected, the electronic device 101 may determine not to apply output conversion effects.

According to an embodiment, if the connection to the first external device 311 or the second external device 313 is detected while audio output is being provided via the sound output device 155, the electronic device 101 may determine whether to apply output conversion effects based on the volume control information of the first external device 311 or the second external device 313. For example, if the volume control information (e.g., set to activation of volume adjustment) is obtained from the first external device 311 (or the second external device 313), the electronic device 101 may determine to apply output conversion effects. If the volume control information is not obtained from the first external device 311, the electronic device 101 may determine not to apply output conversion effects. If the electronic device 101 does not obtain the volume control information from the first external device 311, the electronic device 101 may suspend audio output for a predetermined period of time, and may determine not to apply output conversion effects.

Based on the determination on whether to apply output conversion effects, the electronic device 101 may control audio output via the external device 310. If it is determined that output conversion effects is not to be applied, the electronic device 101 may not apply output conversion effects (e.g., fade-in effects) to audio output via the external device 310. If the electronic device 101 does not apply output conversion effects, the electronic device 101 may maintain a volume designated in the electronic device 101 (e.g., the volume when audio output is provided via the electronic device 101). For example, if audio output is not provided at the point in time at which the connection to the external device 310 is detected, the electronic device 101 may not apply output conversion effects. If it is determined to apply output conversion effects, the electronic device 101 may apply output conversion effects (e.g., fade-in effects) to audio output via the external device 310.

If the electronic device 101 applies output conversion effects, the electronic device 101 may apply fade-out effects to audio signals output via the sound output device 155, and may apply fade-in effects to audio output via the external device 310. The fade-out effects may be changing the volume designated in the electronic device 101 gradually (or sequentially) to the lowest volume (e.g., 0 (mute)) (e.g., gradually decreasing the volume). The fade-in effects may be changing the volume designated in the electronic device 101 gradually (or sequentially) from the lowest to the highest volume (or a designated volume) (e.g., gradually increasing the volume). For example, the electronic device 101 may gradually change the volume designated in the electronic device 101 to the lowest volume (e.g., 0 (mute)) (e.g., applying fade-out effects), and after a predetermined period of time elapses, the electronic device 101 may gradually change the lowest volume to the highest volume (e.g., 0.1f) (e.g., fade-in effects). Alternatively or in addition, based on the connection time or output start time of the external device 310 stored in the memory 130, the electronic device 101 may apply output conversion effects to audio output via the electronic device 101 or the external device 310.

FIG. 3B is a diagram illustrating a network environment 350 in which an electronic device connected to a first external device detects the connection of a second external device.

Referring to FIG. 3B, the electronic device 101 may detect the connection of the second external device 313 while providing audio output via the first external device 311. If the electronic device 101 detects the connection of the second external device 313, which is a new external device, while providing audio output via the first external device 311 which was connected earlier, the electronic device 101 may terminate the connection to the first external device 311. The electronic device 101 may perform control so that audio output provided via the first external device 311 is naturally provided via the second external device 313. Although FIG. 3B illustrates the first external device 311 and the second external device 313, the electronic device 101 may detect the first external device 311 while providing audio output via the third external device 315, or may detect the second external device 313 while providing audio output via the third external device 315. That is, the disclosure is not limited by the shown example.

For example, if the electronic device 101 detects the second external device 313 or is connected to the second external device 313, the electronic device 101 may store the output end time of the first external device 311, the connection time of the second external device 313, and/or the output start time of the second external device 313 in the memory 130. Based on the time information (e.g., the output end time, connection time, or output start time), the electronic device 101 may apply output conversion effects to audio output via the first external device 311 and/or the second external device 313. The output end time of the first external device 311 may be the point in time at which audio output via the first external device 311 is terminated. The connection time of the second external device 313 is the point in time at which the external device 310 is connected, and the output start time of the second external device 313 is the point in time at which audio output via the external device 310 is enabled. For example, the electronic device 101 may apply fade-out effects to audio output via the first external device 311 based on the output end time of the first external device 311 or the connection time of the second external device 313, and may apply fade-in effects to audio output via the second external device 313 based on the output end time of the first external device 311 or the output start time of the second external device 313.

According to an embodiment, if the output start time of the second external device 313 falls within a predetermined period of time from the output end time of the first external device 311, the electronic device 101 may apply output conversion effects to audio output via the second external device 313. Alternatively, if the output start time of the second external device 313 is beyond the predetermined period of time from the output end time of the first external device 311, the electronic device 101 may not apply output conversion effects to audio output via the second external device 313.

According to an embodiment, the second external device 313 may be implemented as a first device 351 or a second device 353. For example, if the second external device 313 is wireless earphones (e.g., Bluetooth earphones), the first device 351 may be the left output device and the second device 353 may be the right output device. The electronic device 101 may apply fade-in effects to audio output via the first device 351 and the second device 353 based on the output start time of the second external device 313. For example, the electronic device 101 may apply fade-in effects by providing audio output via the first device 351 at the output start time of the second external device 313, and after a predetermined period of time (e.g., 0.5 seconds or 1 second) elapses, the electronic device 101 may apply fade-in effects in providing audio output via the second device 353. Alternatively, the reverse is possible.

Figure 4:
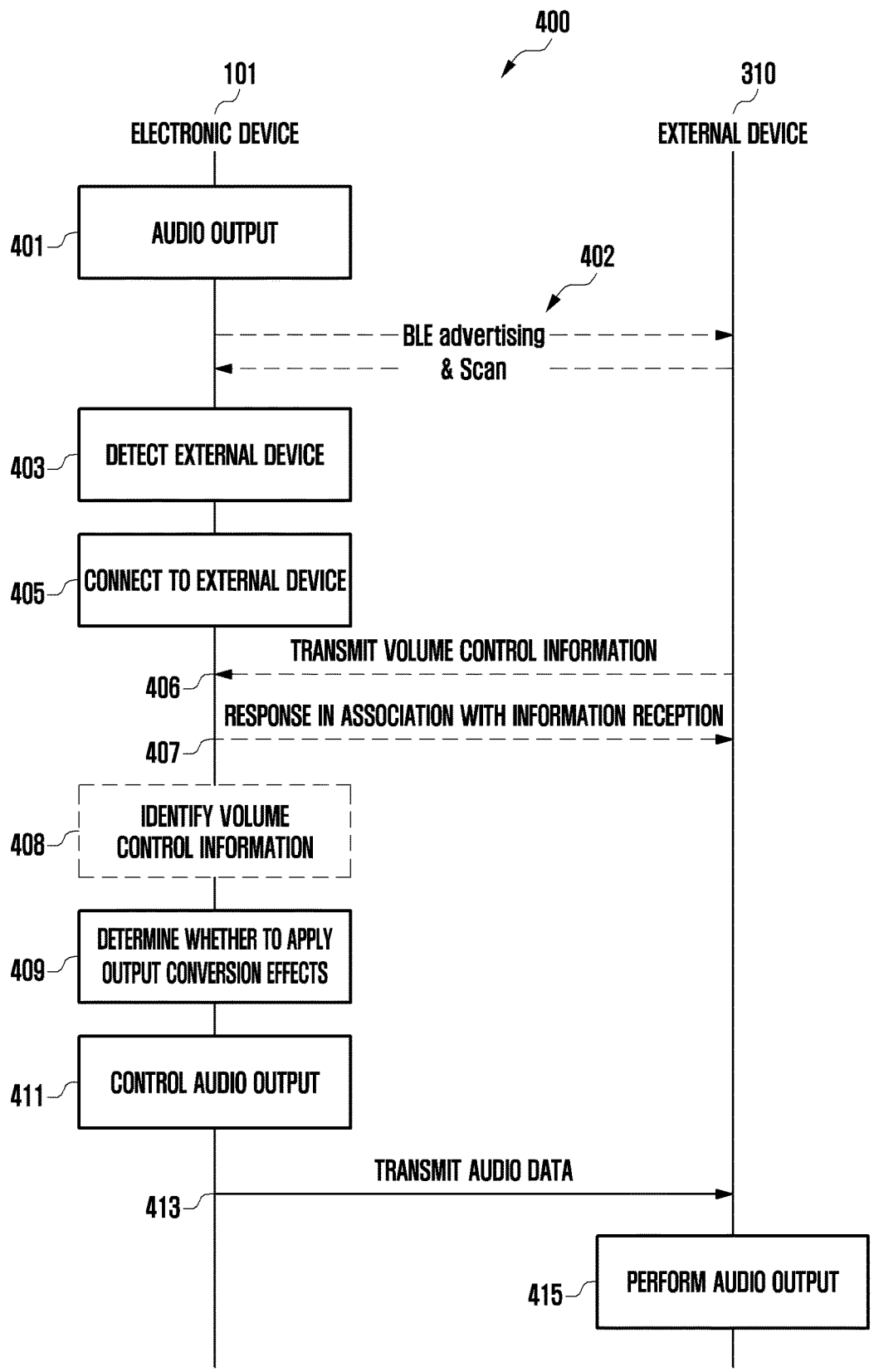
FIG. 4 is a flowchart illustrating an audio output conversion method between an electronic device and an external device according to an embodiment.

FIG. 4 is a flowchart 400 illustrating an audio output conversion method between an electronic device and an external device according to an embodiment.

Referring to FIG. 4, in operation 401, the electronic device (e.g., the electronic device 101 of FIG. 1) according to an embodiment may provide audio output via its own speaker (e.g., the sound output device 155 of FIG. 1). The audio output may be output of sounds such as music, games, movies, or the like. For example, the electronic device 101 may reproduce music via a music reproduction application, or may reproduce (or display) a movie via a video application.

In operation 403, the electronic device 101 may detect the external device 310. The electronic device 101 may or may not perform operation 402 depending on the connection type of the external device 310. If the external device 310 is a wireless device such as the first external device 311 (or the second external device 313), the electronic device 101 may perform advertisement packet broadcasting and scanning via wireless communication (e.g., Bluetooth low energy (BLE)) in operation 402. In operation 403, the electronic device 101 may detect the first external device 311 that transmits a response packet in association with the advertisement packet broadcasted in operation 402. According to an embodiment, if the external device 310 is a wired device such as the third external device 315, the electronic device 101 may omit operation 402, and if a connection part of the third external device 315 is inserted into a connection terminal (e.g., the connection terminal 178 of FIG. 1), the electronic device 101 may detect the third external device 315 in operation 403.

In operation 405, the electronic device 101 may connect to the external device 310. The electronic device 101 may connect to the third external device 315 detected in operation 403 via an interface (e.g., the interface 177 of FIG. 1). Alternatively, the electronic device 101 may connect to the first external device 311 via a communication module (e.g., the communication module 190 of FIG. 1). The electronic device 101 may exchange information with the first external device 311 if it is connected to the first external device 311. The exchanged information may be profile information associated with the electronic device 101 and/or the first external device 311, and may include, for example, device identifiers, device names, or additional information. If the electronic device 101 is connected to the first external device 311, a communication protocol for transmitting audio data and a command protocol for controlling audio output may be used (or configured) between the electronic device 101 and the first external device 311.

According to an embodiment, the communication protocol may be a procedure for configuring an audio data streaming scheme (e.g., an advanced audio distribution profile (A2DP)), or negotiation, configuration, transmission procedure for transmitting audio or video data (e.g., audio/video distribution transport protocol (AVDTP)). The command protocol may be a method of controlling the characteristic of audio data (e.g., audio/video remote control profile (AVRCP)), and may include, for example, instructions such as reproduction, pause, suspension, start, volume control of audio output. Depending on the wireless communication scheme, the communication protocol and the command protocol may be separately configured, or a single protocol may be used to transmit data and instructions.

According to an embodiment, hereinafter, operations 406 and 407 may be operations performed after the command protocol is configured. In addition, operations 409 to 415 may be operations performed after the communication protocol is configured. Although it is illustrated that operations 406 and 407 are performed before operations 409 to 415, operations 406 and 407 may be performed while operations 409 to 415 are being performed or after operations 409 to 415 are performed.

In operation 406, the external device 310 may transmit volume control information to the electronic device 101. The volume control information may include information regarding whether the electronic device is to take charge of volume adjustment. The volume control information may be set to activation (turning on) of the volume adjustment of the external device 310 or may be set to deactivation (or turning off) thereof. If the external device 310 is a wireless device such as the first external device 311 (or the second external device 313), the first external device 311 may connect to the electronic device 101, and may transmit the volume control information to the electronic device 101. The electronic device 101 may store the volume control information in the memory 130.

In operation 407, the electronic device 101 may provide a response to the external device 310 in association with the reception of the information. If the electronic device 101 receives the volume control information from the external device 310, the electronic device 101 may acknowledge that the volume control information is received.

In operation 408, the electronic device 101 may identify the volume control information. The volume control information may be changed by the external device 310 or user settings. If the volume adjustment is activated (or turned on) in the volume control information, the volume adjustment role may be assigned to the external device 310. If the volume adjustment is deactivated (or turned off) in the volume control information, the volume adjustment role may be assigned to the electronic device 101.

According to an embodiment, if the external device 310 is a wired device, such as the third external device 315, the electronic device 101 may omit operations 406 to 408.

In operation 409, the electronic device 101 may determine whether to apply output conversion effects. If the external device 310 is a wired device, such as the third external device 315, the electronic device 101 may determine to apply output conversion effects to the audio output via third external device 315. If the external device 310 is a wireless device such as the first external device 311 (or the second external device 313), the electronic device 101 may determine whether to apply output conversion effects based on the volume control information. If the volume control information is activated, the electronic device 101 may determine to apply output conversion effects to audio output via the first external device 311. If the volume control information is deactivated, the electronic device 101 may determine not to apply output conversion effects to audio output via the first external device 311.

According to an embodiment, if the electronic device 101 does not obtain the volume control information from the first external device 311, the electronic device 101 may suspend audio output at its own speaker for a predetermined period of time, and may determine not to apply output conversion effects.

In operation 411, the electronic device 101 may control audio output. The electronic device 101 may control audio output based on the determination made in operation 409. If the external device 310 is a wired device, such as the third external device 315, the electronic device 101 may perform control so as to apply output conversion effects to audio output via third external device 315. In the case in which the external device 310 is a wireless device, such as the first external device 311, if the volume control information is activated, the electronic device 101 may perform control so as to apply output conversion effects to audio output via the first external device 311. If the volume control information is deactivated, the electronic device 101 may perform control so as not to apply output conversion effects to audio output via the first external device 311.

In operation 413, the electronic device 101 may transmit audio data to the external device 310. If the external device 310 is a wired device, such as the third external device 315, the electronic device 101 may transmit audio data to the third external device 315 via the interface 177. If the external device 310 is a wireless device such as the first external device 311, the electronic device 101 may transmit the audio data to the first external device 311 via a communication protocol (e.g., A2DP or AVDTP) configured between the electronic device 101 and the first external device 311. While performing operation 413, the electronic device 101 may apply fade-out effects to audio signals output via the sound output device 155.

In operation 415, the external device 310 may provide audio output. If output conversion effects are applied to audio output via the external device 310, the volume of audio output may be gradually increased. If output conversion effects are applied to the audio output via the external device 310, the electronic device 101 may apply fade-out effects (gradual decrease) to audio signals output via the sound output device 155, may adjust the volume designated in the electronic device 101 gradually from the lowest volume to the highest volume, and may apply fade-in effects (gradual increase) to audio output via the external device 310. If output conversion effects are not applied to audio output via the external device 310, the volume of the audio output may be maintained to be constant. The electronic device 101 may maintain the volume designated in the electronic device 101.

Although it is described that operations 411 to 415 are separate operations for ease of description, operations 411 to 415 may be performed as a single operation or operations that are performed concurrently.

Figure 5:
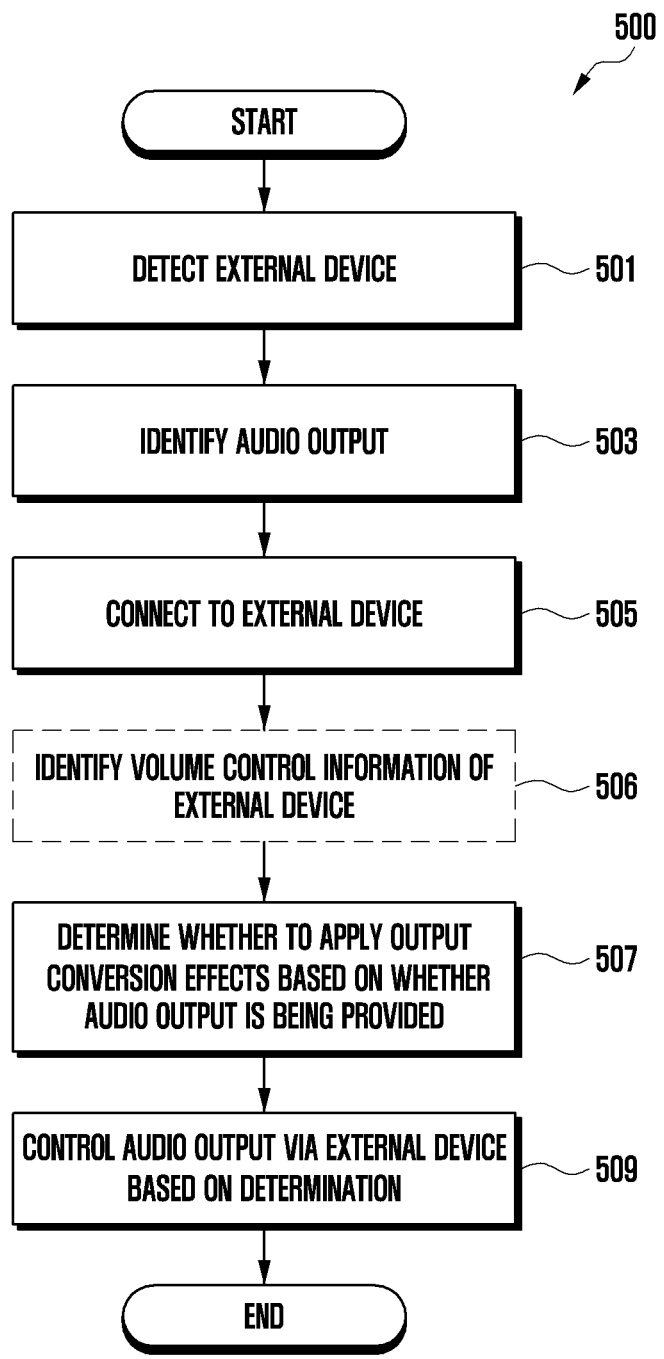
FIG. 5 is a flowchart illustrating an operation method of an electronic device according to an embodiment.

FIG. 5 is a flowchart 500 illustrating an operation method of an electronic device according to an embodiment.

Referring to FIG. 5, in operation 501, a processor (e.g., the processor 120 of FIG. 1) of an electronic device (e.g., the electronic device 101 of FIG. 1) according to an embodiment may detect an external device (e.g., the external device 310 of FIG. 3A). The processor 120 may perform advertisement packet broadcasting and scanning via wireless communication. The advertisement packet broadcasting and scanning may be performed according to a request from a user. The processor 120 may detect a first external device (e.g., the first external device 311 or the second external device 313 of FIG. 3A) that transmits a response packet in association with the broadcasted advertisement packet. Alternatively, if a connection part of a third external device (e.g., the third external device 315 of FIG. 3A) is inserted into a connection terminal (e.g., the connection terminal 178 of FIG. 1) of the electronic device 101, the processor 120 may detect the third external device 315.

In operation 503, the processor 120 may identify (or determine) audio output. If the external device 310 is detected or connected, the processor 120 may identify whether audio output is currently provided via a speaker (e.g., the sound output device 155) of the electronic device 101.

In operation 505, the processor 120 may connect to the external device 310. In the case of a wired device such as the third external device 315, the processor 120 may connect to the third external device 315 via an interface (e.g., the interface 177 of FIG. 1). In the case of a wireless device such as the first external device 311, the processor 120 may connect to the first external device 311 via a communication module (e.g., the communication module 190 of FIG. 1). After the processor 120 is connected to the first external device 311, a communication protocol or a command protocol may be used (or configured) between the processor 120 and the first external device 311. According to an embodiment, the processor 120 may store the connection time of the external device 310 or the output start time of the external device 310 in a memory (e.g., the memory 130 of FIG. 1).

Although it is illustrated that operation 505 is performed after operation 503, operations 503 and 505 may be performed in parallel, or operation 505 may be performed before operation 503. The order of operations may be changed depending on implementation, and the disclosure is not limited to the above description.

In operation 506, the processor 120 identifies volume control information of the external device 310. After the processor 120 is connected to the first external device 311, the command protocol may be used (or configured) between the processor 120 and the first external device 311, and then, the processor 120 may receive the volume control information from the first external device 311. If the processor 120 receives the volume control information, the processor 120 may provide a response to the first external device 311 in association with the reception of the volume control information. The volume control information may include information regarding whether to take charge of volume adjustment. If the volume adjustment is activated (or turned on) in the volume control information, the volume adjustment role may be assigned to the external device 310. If the volume adjustment is deactivated (or turned off) in the volume control information, the volume adjustment role may be assigned to the electronic device 101. The vice versa may also be implemented in a different embodiment. According to an embodiment, operation 506 may be omitted when the external device 310 is a wired device such as the third external device 315.

According to an embodiment, if the electronic device 101 is connected to the external device 310, the electronic device 101 may produce an output adjustment object of the external device 310, separately from an output adjustment object of the electronic device 101, and may store the same in the memory 130. The output adjustment object (e.g., a first output adjustment object) of the electronic device 101 is used to control the volume of the electronic device 101, and the output adjustment object (e.g., a second output adjustment object) of the external device 310 is used to control the volume of the external device 310. The electronic device 101 may manage the output adjustment object of the external device 310 based on the volume control information. For example, if the volume adjustment of the volume control information is activated (or turned on), the electronic device 101 may change the volume of the electronic device 101 to the highest volume, and may store the output adjustment object of the external device 310 based on the changed volume of the electronic device 101. If the volume adjustment of the volume control information is deactivated (or turned off), or the volume control information is not obtained, the electronic device 101 may store the output adjustment object of the external device 310 based on the volume of the electronic device 101.

In operation 507, based on whether audio output is provided, the processor 120 may determine whether to apply output conversion effects. For example, if it is identified that audio output is provided in operation 503, the processor 120 may determine to apply the output conversion effects. For example, if it is identified that audio output is not provided in operation 503, the processor 120 may determine not to apply the output conversion effects. According to an embodiment, if it is identified that audio output is provided in operation 503 and it is identified that the volume control information is set to activation in operation 506, the processor 120 may determine to apply the output conversion effects. If it is identified that audio output is provided in operation 503 and it is identified that the volume control information is set to deactivation in operation 506, the processor 120 may determine not to apply the output conversion effects. If it is identified that audio output is not provided in operation 503, the processor 120 may determine not to apply the output conversion effects, irrespective of the volume control information.

In operation 509, the processor 120 may control audio output via the external device 310 based on the determination. Based on the determination, the processor 120 may apply the output conversion effects to audio output via the external device 310, or may not apply the output conversion effects. In the case of applying the output conversion effects to the audio output via the external device 310, the processor 120 may transmit audio data to the external device 310, and may gradually change the volume designated in the electronic device 101 from the lowest volume to the highest volume, thereby applying fade-in effects to audio output via the external device 310. For example, the processor 120 may gradually change the volume designated in the electronic device 101 to the lowest volume based on the connection time of the external device 310, and may gradually change the volume designated in the electronic device 101 from the lowest volume to the highest volume based on the output start time of the external device 310. The processor 120 may display a user interface associated with the output conversion effects on a display (e.g., the display device 160 of FIG. 1). Alternatively, in the case of not applying the output conversion effects to audio output via the output device 310, the processor 120 may transmit audio data to the external device 310, and may maintain the volume designated in the electronic device 101 to be constant.

According to an embodiment, in the case of applying the output conversion effects to the audio output via the external device 310, the processor 120 may apply fade-out effects to the volume of the electronic device 101 using an output adjustment object of the electronic device 101, and may apply fade-in effects to the volume of the external device 310 (e.g., may gradually increase the volume from the lowest volume to a volume set in the external device 310) using an output adjustment object of the external device 310. For example, if the external device 310 is a wired device such as the third external device 315, the fade-out effects and the fade-in effects may be controlled using the output adjustment object of the electronic device 101. If the external device 310 is a wireless device, such as the first external device 311 (or the second external device 313), the fade-out effects may be controlled using the output adjustment object of the electronic device 101, and the fade-in effects may be controlled using the output adjustment object of the external device 310.

According to an embodiment, if the processor 120 does not obtain the volume control information from the first external device 311 before operation 509, the processor 120 may suspend audio output for a predetermined period of time, not apply the output conversion effects, and output audio data via the first external device 311.

Figure 6A:
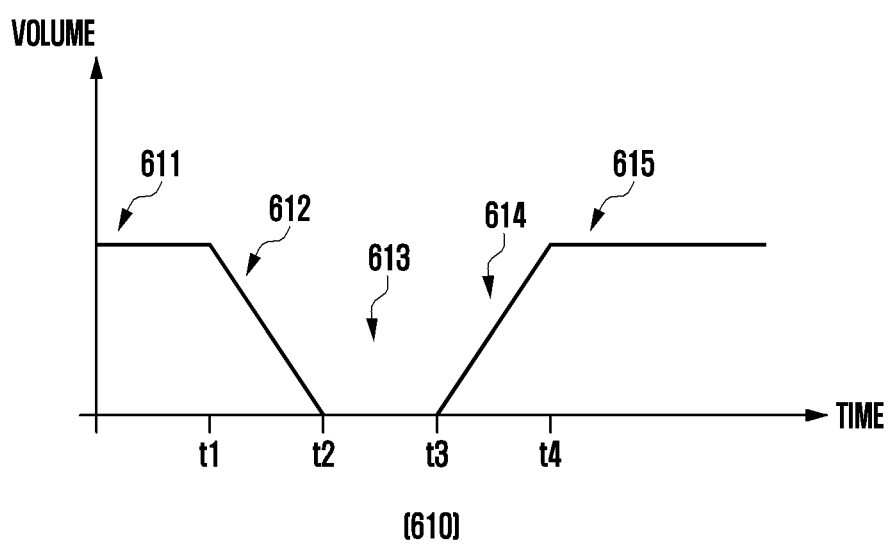
FIG. 6A is a diagram illustrating an audio output control graph showing audio output control of an electronic device and an external device over time according to an embodiment.
Figure 6A:
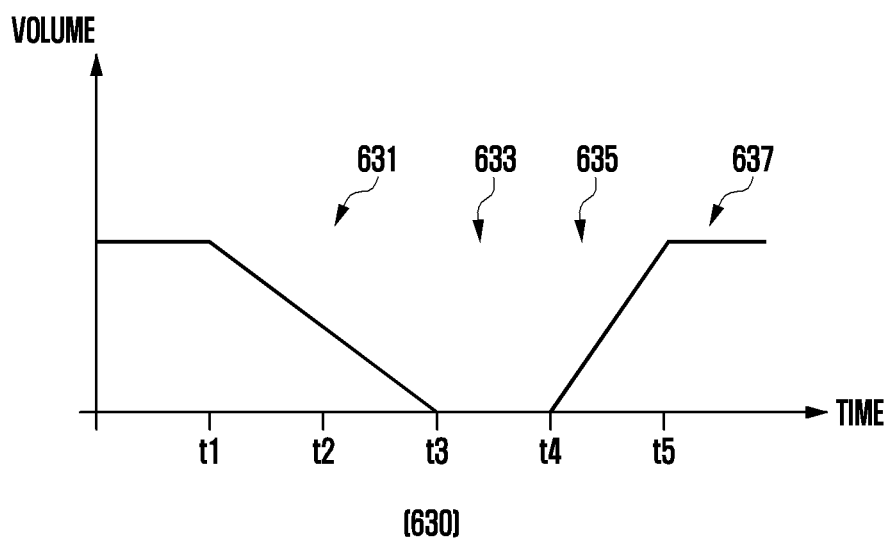
Figure 6B:
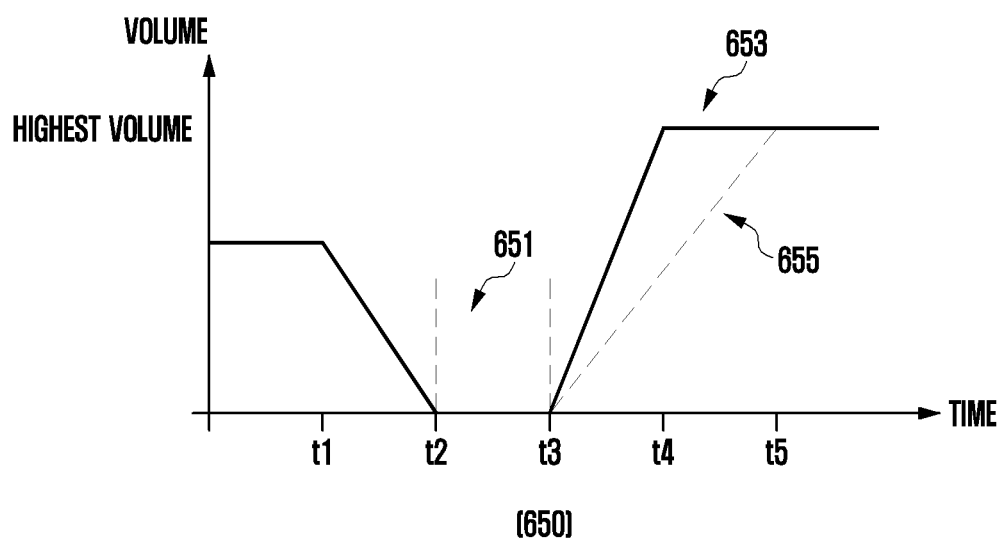
FIG. 6B is a diagram illustrating an audio output control graph showing audio output control of an electronic device and an external device over time according to another embodiment.
Figure 6B:
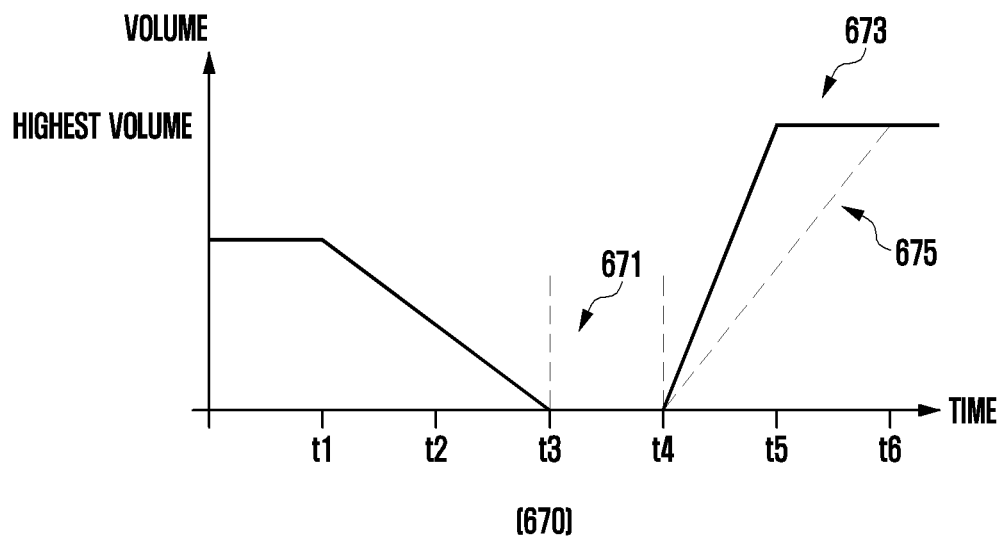

FIG. 6A is a diagram illustrating an audio output control graph showing audio output control of an electronic device and an external device over time according to an embodiment, and FIG. 6B is a diagram illustrating an audio output control graph showing audio output control of an electronic device and an external device over time according to another embodiment.

FIG. 6A is a diagram illustrating an audio output control graph showing audio output control over time if an electronic device is connected to the third external device, i.e. a wired device.

Referring to FIG. 6A, a first audio output control graph 610 may show an example of applying output conversion effects over time if the electronic device (e.g., the electronic device 101 of FIG. 1) is connected to the third external device (e.g., the third external device 315 of FIG. 3A) as indicated by an arrow 612 while the electronic device is providing audio output according to an embodiment as indicated by an arrow 611. The third external device 315 is a wired device, and thus, if the electronic device 101 is providing audio output at the point in time at which the third external device 315 is detected, the electronic device 101 may apply output conversion effects irrespective of volume control information. The first time (t1) may be the point in time at which the electronic device 101 detects the third external device 315 or connects to the third external device 315. The third time (t3) may be the point in time at which audio output via the third external device 315 is enabled (e.g., an output start time). The second time (t2) may be a point in time (e.g., 0.5 seconds or one second after t1) between the first time (t1) and the third time (t3). The electronic device 101 may set the second time (t2) based on the first time (t1) and the third time (t3). For example, the electronic device 101 may set the second time (t2) in consideration of convenience of the user. Alternatively, the second time (t2) may be set by the user of the electronic device 101.

The electronic device 101 may apply fade-out effects to audio signals output via a speaker (e.g., the sound output device 155 of FIG. 1) from the first time (t1). Since the electronic device 101 detects the third external device 315 while providing audio output, the electronic device 101 may apply fade-out effects to audio signals output via the sound output device 155. The electronic device 101 may gradually change the volume (e.g., 50% of full volume) designated in the electronic device 101 to the lowest volume (e.g., 0.0 mute) during the time interval 612 from the first time (t1) to the second time (t2). The electronic device 101 may suspend audio output during the time interval 613 from the second time (t2) to the third time (t3) in order to reduce the occurrence of popping noises.

The electronic device 101 may apply fade-in effects to audio output via the third external device 315 at the third time (t3). The electronic device may gradually change volume from the lowest volume to a volume designated in the electronic device 101 (e.g., a previously designated volume) during the time interval 614 from the third time (t3) to a fourth time (t4). The previously designated volume may be the volume designated in the electronic device 101 at the point in time at which the third external device 315 is detected. The first time interval 613 from the second time (t2) to the third time (t3) may be the same as, or different from, the second time interval 614 from the third time (t3) to the fourth time (t4). For example, the first time interval 613 may be shorter than, or may longer than the second time interval 614. Audio data which has been output until the second time (t2) may be continuously output via the third external device 315 at the third time (t3). The electronic device 101 may apply fade-in effects during the second time interval 614, and may output audio data via the third external device 315 at the volume designated in the electronic device 101 in the time interval 615 after the fourth time (t4). The electronic device 101 may control the volume of audio signals output via the third external device 315 based on a user input.

The second audio output control graph 630 may show another example of applying output conversion effects over time if the electronic device 101 is connected to the third external device 315 while providing audio output. A fourth time (t4) may be the point in time after a first predetermined period of time from the third time (t3). A fifth time (t5) may be the point in time after a second predetermined period of time from the fourth time (t4). The fourth time (t4) or the fifth time (t5) may be set by the electronic device 101 or a user.

The electronic device 101 may apply fade-out effects to audio signals output via the sound output device 155 during a time interval 631 from the first time (t1) to the third time (t3). The electronic device 101 may gradually change the volume (e.g., 50% of full volume) designated in the electronic device 101 to the lowest volume (e.g., 0.0) during the time interval 631 from the first time (t1) to the third time (t3). The electronic device 101 may suspend audio output during the time interval 633 from the third time (t3) to the fourth time (t4). After the fourth time (t4), the electronic device 101 may gradually change volume from the lowest volume to a volume designated in the electronic device 101 (e.g., a previously designated volume), thereby applying the fade-in effects to audio signals output via the third external device 315. The second time interval 633 from the third time (t3) to the fourth time (t4) may be the same as, or different from, the third time interval 635 from the fourth time (t4) to the fifth time (t5). For example, the second time interval 633 may be shorter than, or may longer than, the third time interval 635. Audio data which has been output until the third time (t3) may be continuously output via the third external device 315 at the fourth time (t4). The electronic device 101 may apply fade-in effects during the third time interval 635, and may output audio data via the third external device 315 at the volume designated in the electronic device 101 in a time interval 637 after the fifth time (t5).

FIG. 6B is a diagram illustrating an audio output control graph showing audio output control over time if an electronic device is connected to the first external device, i.e. a wireless device.

Referring to FIG. 6B, the third audio output control graph 650 may show an example of applying output conversion effects over time if the electronic device 101 is connected to a first external device (e.g., the first external device 311 of FIG. 3A or the second external device 313 of FIG. 3A) while providing audio output. Descriptions of the first time (t1) to the third time (t3) may be the same as those of the first audio output control graph 610. The electronic device 101 may apply fade-out effects to audio signals output via a speaker (e.g., the sound output device 155 of FIG. 1) from the first time (t1). The electronic device 101 may gradually change the volume (e.g., 50% of full volume) designated in the electronic device 101 to the lowest volume (e.g., 0.0) during the time interval from the first time (t1) to the second time (t2). The electronic device 101 may suspend audio output during the time interval 651 from the second time (t2) to the third time (t3).

According to an embodiment, the electronic device 101 may obtain volume control information of the first external device 311 during the interval from the first time (t1) to the third time (t3). If the electronic device 101 obtains the volume control information from the first external device 311, the electronic device 101 may store the volume control information in a memory (e.g., the memory 130 of FIG. 1).

If the electronic device 101 is connected to the first external device 311, the electronic device 101 may produce an output adjustment object of the first external device 311, separately from an output adjustment object of the electronic device 101, and may store the same in the memory 130. The output adjustment object of the electronic device 101 is to control the volume of the electronic device 101, and the output adjustment object of the first external device 311 is to control the volume of the external device 310. The electronic device 101 may manage the output adjustment object of the first external device 311 based on the volume control information. For example, if the volume adjustment of the volume control information is activated (or turned on), the electronic device 101 may change the volume of the electronic device 101 to the highest volume, and may store the output adjustment object of the first external device 311 based on the changed volume of the electronic device 101. If the volume adjustment of the volume control information is deactivated (or turned off), or the volume control information is not obtained, the electronic device 101 may store the output adjustment object of the first external device 311 based on the volume of the electronic device 101.

The electronic device 101 may apply fade-in effects to audio output via the first external device 311 if the volume control information obtained before the third time (t3) is activated. The electronic device 101 may gradually change volume from the lowest volume to the highest volume (e.g., 100% of full volume) during a time interval 653 from the third time (t3) to a fourth time (t4). Alternatively, the electronic device 101 may gradually change volume from the lowest volume to the highest volume during a time interval 655 from the third time (t3) to a fifth time (t5). A user may control the volume of audio signals output via the first external device 311 using the first external device 311.

According to an embodiment, the electronic device 101 may apply fade-out effects to the volume of the electronic device 101 using the output adjustment object of the electronic device 101 from the first time (t1) to the second time (t2), and may apply fade-in effects to the volume of the first external device 311 using the output adjustment object of the first external device 311 during the time interval 653 from the third time (t3) to the fourth time (t4). The electronic device 101 may apply fade-out effects to the volume of the electronic device 101, and may gradually increase the volume of the external device 310 from the lowest volume to a volume set in the external device 310, thereby applying fade-in effects. For example, if the external device 310 is a wired device such as the third external device 315, the fade-out effects and the fade-in effects may be controlling the volume of the electronic device 101 using the output adjustment object of the electronic device 101. If the external device 310 is a wireless device, such as the first external device 311 (or the second external device 313), the fade-out effects may be controlling the volume of the electronic device 101 using the output adjustment object of the electronic device 101, and the fade-in effects may be controlling the volume of the external device 310 using the output adjustment object of the first external device 311.

A fourth audio output control graph 670 may show another example of applying output conversion effects over time if the electronic device 101 is connected to the first external device 311 while the electronic device 101 is providing audio output. Descriptions of the first time (t1) to the third time (t3) may be the same as those of the second audio output control graph 630. The electronic device 101 may apply fade-out effects to audio signals output via a speaker (e.g., the sound output device 155 of FIG. 1) from the first time (t1). The electronic device 101 may gradually change a volume designated in the electronic device 101 to the lowest volume during the time interval from the first time (t1) to the third time (t3). The electronic device 101 may suspend audio output during a time interval 671 from the third time (t3) to the fourth time (t4).

According to an embodiment, the electronic device 101 may apply fade-in effects to audio output via the first external device 311 if the volume control information obtained before the third time (t3) is activated. The electronic device 101 may gradually change the volume of the electronic device 101 from the lowest volume to the highest volume during a time interval 673 from the fourth time (t4) to a fifth time (t5) using the output adjustment object of the electronic device 101. Alternatively, the electronic device 101 may gradually change (or increase) the volume of the first external device 311 from the lowest volume to a volume designated in the first external device 311 during the time interval 673 from the fourth time (t4) to the fifth time (t5) using the output adjustment object of the first external device 311. Alternatively, the electronic device 101 may gradually change the volume of the electronic device 101 from the lowest volume to the highest volume during a time interval 675 from the fourth time (t4) to a sixth time (t6) using the output adjustment object of the electronic device 101.

Figure 7A:
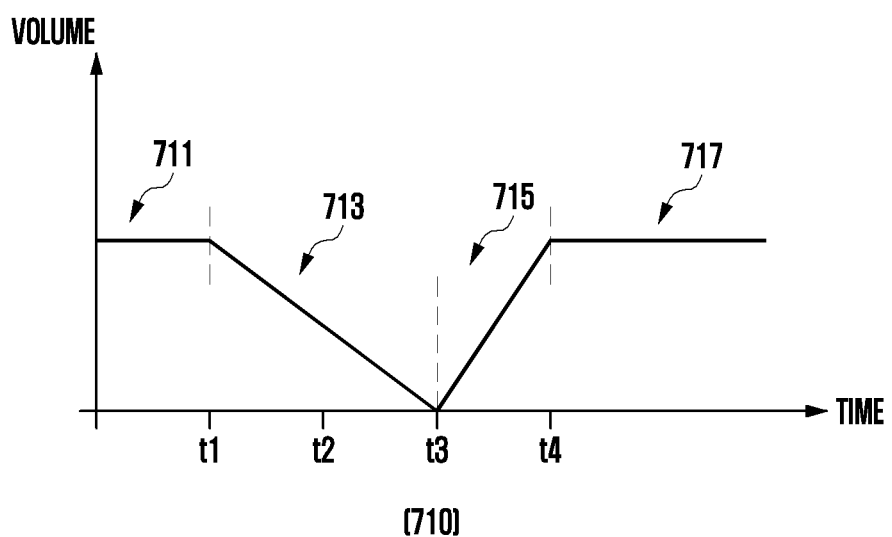
FIG. 7A is a diagram illustrating an audio output control graph showing audio output control of an electronic device and an external device over time according to an embodiment.
Figure 7B:
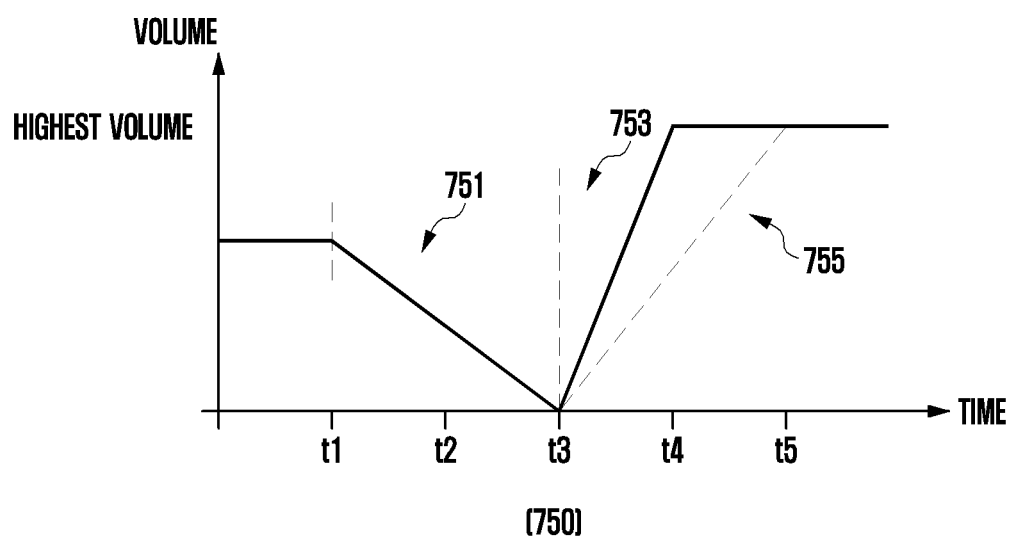
FIG. 7B is a diagram illustrating an audio output control graph showing audio output control of an electronic device and an external device over time according to another embodiment.
Figure 7B:
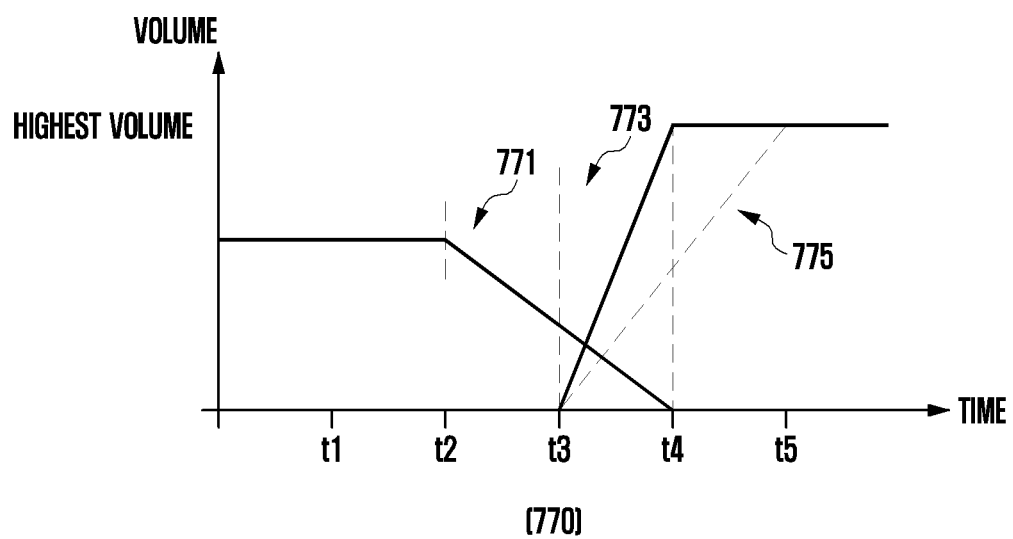

FIG. 7A is a diagram illustrating an audio output control graph showing audio output control of an electronic device and an external device over time according to an embodiment, and FIG. 7B is a diagram illustrating an audio output control graph showing audio output control of an electronic device and an external device over time according to another embodiment.

FIG. 7A is a diagram illustrating an audio output control graph showing audio output control over time if an electronic device is connected to the third external device.

Referring to FIG. 7A, a first audio output control graph 710 may show an example of applying output conversion effects over time, if the electronic device (e.g., the electronic device 101 of FIG. 1) is connected to the third external device (e.g., the third external device 315 of FIG. 3A) during a time interval 711 in which the electronic device is providing audio output according to an embodiment. Descriptions of a first time (t1) to a fourth time (t4) may be the similar as those of the second audio output control graph 610 of FIG. 6A. The electronic device 101 may apply fade-out effects to audio signals output via the sound output device 155 of the electronic device 101 during a time interval 713 from the first time (t1) to the third time (t3). For example, the electronic device 101 may gradually change a volume (e.g., 50% of full volume) designated in the electronic device 101 to the lowest volume (e.g., 0.0 mute) during the first time interval 713.

The electronic device 101 may apply fade-in effects to audio output via the third external device 315 at the third time (t3). The electronic device 101 may apply the fade-in effects, immediately after applying the fade-out effects. The electronic device 101 may change the volume of the electronic device 101 from the lowest volume to a volume designated in the electronic device 101 (e.g., a previously designated volume) during a time interval 715 from the third time (t3) to the fourth time (t4). The previously designated volume may be the volume designated in the electronic device 101 at the point in time at which the third external device 315 is detected. Audio data which has been output via the electronic device 101 up to the third time (t3) may be continuously output via the third external device 315. The electronic device 101 may apply fade-in effects during the second time interval 715, and may output audio data via the third external device 315 at the volume designated in the electronic device 101 in a time interval 717 after the fourth time (t4). A user may use the electronic device 101 so as to control the volume of audio signals output via the third external device 315.

FIG. 7B is a diagram illustrating an audio output control graph showing audio output control over time if an electronic device is connected to the first external device.

Referring to FIG. 7B, a second audio output control graph 750 may show an example of applying output conversion effects over time if the electronic device 101 is connected to the first external device (e.g., the first external device 311 of FIG. 3A or the second external device 313 of FIG. 3A) while the electronic device 101 is providing audio output. Descriptions of a first time (t1) to a third time (t3) may be the same as those of the second audio output control graph 630 of FIG. 6A. The electronic device 101 may apply fade-out effects to audio signals output via a speaker (e.g., the sound output device 155 of FIG. 1) from the first time (t1). The electronic device 101 may gradually change a volume (e.g., 50% of full volume) designated in the electronic device 101 to the lowest volume (e.g., 0.0) during a time interval 751 from the first time (t1) to the third time (t3).

According to an embodiment, the electronic device 101 may obtain volume control information of the first external device 311 during the time interval 751 from the first time (t1) before the third time (t3). The electronic device 101 may apply fade-in effects to audio output via the first external device 311 if the volume control information obtained before the third time (t3) is activated. The electronic device 101 may change the volume of the electronic device 101 from the lowest volume to the highest volume during a time interval 753 from the third time (t3) to a fourth time (t4). Alternatively, the electronic device 101 may change the volume of the electronic device 101 from the lowest volume to the highest volume during a time interval 755 from the third time (t3) to a fifth time (t5). A user may control the volume of audio signals output via the first external device 311 using the first external device 311.

According to an embodiment, if the electronic device 101 is connected to the first external device 311, the electronic device 101 may produce an output adjustment object of the first external device 311, separately from an output adjustment object of the electronic device 101, and may store the same in the memory 130. The electronic device 101 may apply fade-out effects to the volume of the electronic device 101 using the output adjustment object of the electronic device 101 during the time interval 751 from the first time (t1) to the third time (t3), and may apply fade-in effects to the volume of the first external device 311 using the output adjustment object of the first external device 311 during the time interval 753 from the third time (t3) to the fourth time (t4). The electronic device 101 may apply fade-out effects to the volume of the electronic device 101, and may gradually increase the volume of the external device 310 from the lowest volume to a volume set in the external device 310, thereby applying fade-in effects. For example, if the external device 310 is a wireless device, such as the first external device 311 (or the second external device 313), the fade-out effects may be controlling the volume of the electronic device 101 using the output adjustment object of the electronic device 101, and the fade-in effects may be controlling the volume of the external device 310 using the output adjustment object of the first external device 311.

A third audio output control graph 770 may show another example of applying output conversion effects over time if the electronic device 101 is connected to the first external device 311 while the electronic device 101 is providing audio output. The electronic device 101 may apply fade-out effects to audio signals output via the sound output device 155 during a first predetermined time interval 771 from a second time (t2) to a fourth time (t4). The electronic device 101 may change the volume designated in the electronic device 101 to the lowest volume during the first predetermined time interval 771. During a second predetermined time interval 773 from a third time (t3) to the fourth time (t4), the electronic device 101 may decrease the volume designated in the electronic device 101 to the lowest volume using the output adjustment object of the electronic device 101, and may increase the volume of the first external device 311 from the lowest volume using the output adjustment object of the first external device 311. The electronic device 101 may output audio data overlappingly via the electronic device 101 and the first external device 311 during the second predetermined time interval 773.

The electronic device 101 may apply fade-in effects to audio signals output via the first external device 311 during the second time interval 773. Alternatively, the electronic device 101 may apply fade-in effects to audio signals output via the first external device 311 during a third predetermined time interval 775 from the third time (t3) to a fifth time (t5). The lengths of the first predetermined time interval 771, the second predetermined time interval 773, or the third predetermined time interval 775 may be the same as, or different from, one another. For example, the first predetermined time interval 771 may be shorter than, or may longer than, the third predetermined time interval 775.

Figure 8:
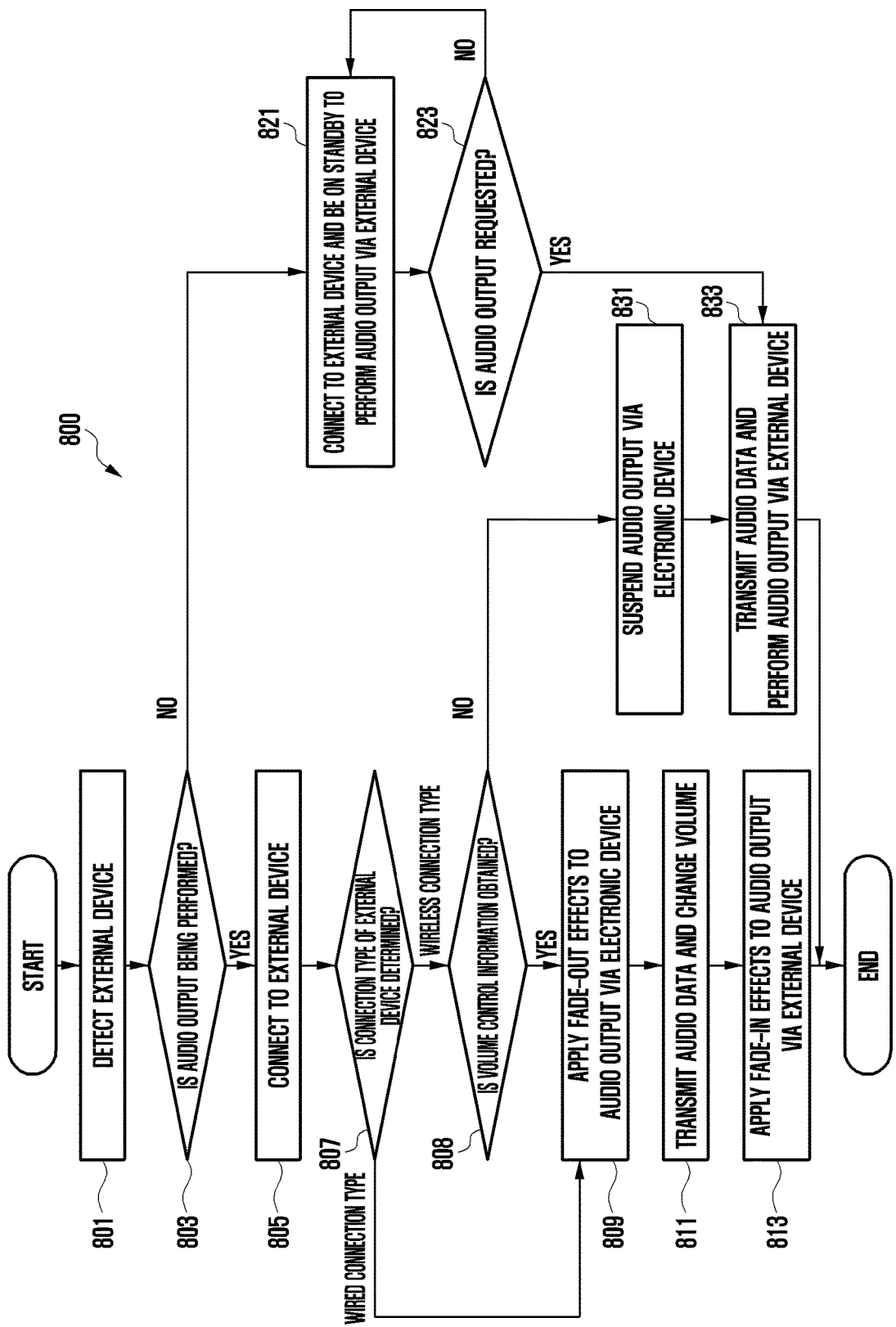
FIG. 8 is a flowchart illustrating an audio output conversion method of an electronic device according to an embodiment.

FIG. 8 is a flowchart 800 illustrating an audio output conversion method of an electronic device according to an embodiment.

Referring to FIG. 8, in operation 801, a processor (e.g., the processor 120 of FIG. 1) of an electronic device (e.g., the electronic device 101 of FIG. 1) according to an embodiment may detect an external device (e.g., the external device 310 of FIG. 3A). The processor 120 may detect the external device 310 (e.g., the first external device 311, the second external device 313, or the third external device 315) via wired or wireless connections. Operation 801 is the same as, or similar to, operation 501 of FIG. 5, and thus, detailed descriptions thereof may be omitted.

In operation 803, the processor 120 may determine (or identify) whether audio output is being provided. If the external device 310 is detected or connected, the processor 120 may identify whether audio output is being provided via a speaker (e.g., the sound output device 155) of the electronic device 101. If the audio output is being provided when the external device 310 is detected, the processor 120 may proceed with operation 805. If the audio output is not performed when the external device 310 is detected, the processor 120 may proceed with operation 821.

If the audio output is being provided when the external device 310 is detected, the processor 120 may connect to the external device 310 in operation 805. In the case of a wired device such as the third external device 315, the processor 120 may connect to the third external device 315 via an interface (e.g., the interface 177 of FIG. 1). In the case of a wireless device such as the first external device 311 (or the second external device 313), the processor 120 may connect to the first external device 311 via a communication module (e.g., the communication module 190 of FIG. 1). If the processor 120 is connected to the external device 310, the processor 120 may store the connection time of the external device 310 or the output start time of the external device 310 in a memory (e.g., the memory 130 of FIG. 1). Operation 805 is the same as, or similar to, operation 505 of FIG. 5, and thus, detailed descriptions thereof may be omitted.

Although it is illustrated that operation 805 is performed after operation 803, operations 803 and 805 may be performed in parallel, and operation 805 may be performed before operation 803 or after operation 807. The order of operations may be changed depending on implementation, and the disclosure is not limited to the above description.

In operation 807, the processor 120 identify the connection type of the external device 310. The processor 120 may proceed with operation 809 or operation 808, depending on the connection type of the external device 310. For example, if the external device 310 is a wired device, such as the third external device 315, the processor 120 may proceed with operation 809. If the external device 310 is a wireless device, such as the first external device 311, the processor 120 may proceed with operation 808.

If the external device 310 is a wireless device, the processor 120 may determine whether the volume control information of the external device 310 is obtained from the external device 310 in operation 808. The volume control information may include information regarding whether to take charge of volume control. After the processor 120 is connected to the first external device 311, the command protocol may be used (or configured) between the processor 120 and the first external device 311, and then, the processor 120 may receive the volume control information from the first external device 311. According to an embodiment, if the processor 120 obtains the volume control information from the first external device 311, the processor 120 may store the volume control information in a memory (e.g., the memory 130 of FIG. 1). If the processor 120 is connected to the first external device 311, the processor 120 may produce an output adjustment object of the first external device 311, separately from an output adjustment object of the electronic device 101, and may store the same in the memory 130. For example, if the volume control information of the external device 310 is obtained, the processor 120 may proceed with operation 809. If the volume control information of the external device 310 is not obtained, the processor 120 may proceed with operation 831.

In operation 809, the processor 120 may apply fade-out effects to audio output via the electronic device 101. Operation 809 may be performed when the external device 310 is a wired device such as the third external device 315, or may be performed when the external device 310 is a wireless device such as the first external device 311, and the volume control information is obtained in operation 808. For example, the fade-out effects may be gradually changing a volume designated in the electronic device 101 to be decreased to the lowest volume. For example, the processor 120 may change the volume designated in the electronic device 101 (e.g., a designated volume before operation 809) to the lowest volume from the connection time of the external device 310 stored in the memory 130, thereby applying fade-out effects to the audio output via the electronic device 101. The processor 120 may apply the fade-out effects to the volume of the electronic device 101 using the output adjustment object of the electronic device 101.

In operation 811, the processor 120 may transmit audio data to the external device 310 and may change volume. The processor 120 may transmit audio data to the external device 310 in order to output audio data via the external device 310. In addition, the processor 120 may change the volume designated in the electronic device 101 to the lowest volume, or may maintain the lowest volume for a predetermined period of time.

In the drawing, although operations 809 and 811 are illustrated as separate operations, operations 809 and 811 may be performed in parallel.

In operation 813, the processor 120 may apply fade-in effects to audio output via the external device 310. The fade-in effects may be gradually changing the volume designated in the electronic device 101 from the lowest volume to the highest volume or to a designated volume. For example, the processor 120 may change the volume of the electronic device 101 from the lowest volume to the highest volume, thereby applying fade-in effects to audio output via the external device 310. According to an embodiment, the processor 120 may apply fade-out effects to the audio output via the electronic device 101, and after a predetermined period of time (e.g., 0.5 seconds or one second) elapses, the processor 120 may gradually increase the volume of the electronic device 101 from the lowest volume to the highest volume. The processor 120 may apply fade-in effects to the audio output via the external device 310 at the output start time of the external device 310 stored in the memory 130. According to an embodiment, if the external device 310 is the wired third external device 315, the processor 120 may apply the fade-in effects to the volume of the electronic device 101 using the output adjustment object of the electronic device 101. According to an embodiment, if the external device 310 is the wireless first external device 311, the processor 120 may apply the fade-in effects to the volume of the first external device 311 using the output adjustment object of the first external device 311.

In the drawing, although operations 811 and 813 are illustrated as separate operations, operations 811 and 813 may be performed in parallel. Alternatively, some of operations 809 to operation 813 may be performed in parallel. For example, while transmitting audio data to the external device 310 (e.g., operation 811), the processor 120 may apply fade-out effects to audio output via the electronic device 101, and may apply fade-in effects to audio output via the external device 310. The processor 120 may perform operation 809 of applying fade-out effects and operation 813 of applying fade-in effect, partially in parallel.

If the audio output is not being provided when the external device 310 is detected, the processor 120 may connect to the external device 310 and may be on standby to perform audio output via the external device 310 in operation 821. The processor 120 may be on standby to perform audio output via the external device 310 until a user input is provided (e.g., an audio output request). According to an embodiment, if the processor 120 connects to the external device 310, the processor 120 may change the volume of the electronic device 101 to the lowest volume in order to reduce the occurrence of popping noise, and when the connection to the external device is completed, the processor 120 may change the volume of the electronic device 101 to a previous volume (e.g., a designated volume before operation 821).

In operation 823, the processor 120 may determine whether audio output is requested from the user. If the audio output is requested, the processor 120 may proceed with operation 833, and if the audio output is not requested, the processor 120 may return to operation 821. The processor 120 may return to operation 821, and may be on standby to perform audio output via the external device 310 until audio output is requested from the user.

In operation 831, the processor 120 may stop audio output via the electronic device 101. Operation 831 may be performed when volume control information is not received from the first external device 311 although the electronic device 101 is connected to the wireless first external device 311 while audio output is being provided via the electronic device 101. If the volume control information is not obtained from the first external device 311 at the point in time (e.g., output start time) at which the audio output via the first external device 311 is enabled, the processor 120 may suspend audio output via the electronic device 101. If the volume control information is not obtained at the output start time of the first external device 311, the processor 120 may change the volume of the electronic device 101 to the lowest volume and may maintain the lowest volume for a predetermined period of time (e.g., one second).

In operation 833, the processor 120 may transmit audio data to the external device 310 and may provide audio output via the external device 310. Operation 833 may be performed after operation 831, or may be performed when an audio output request is detected while the processor is on standby to perform audio output via the external device 310 in operations 821 to operation 823. The processor 120 may not apply output conversion effects (e.g., fade-in effects) to audio output via the external device 310, and may provide audio output via the external device 310.

Figure 9:
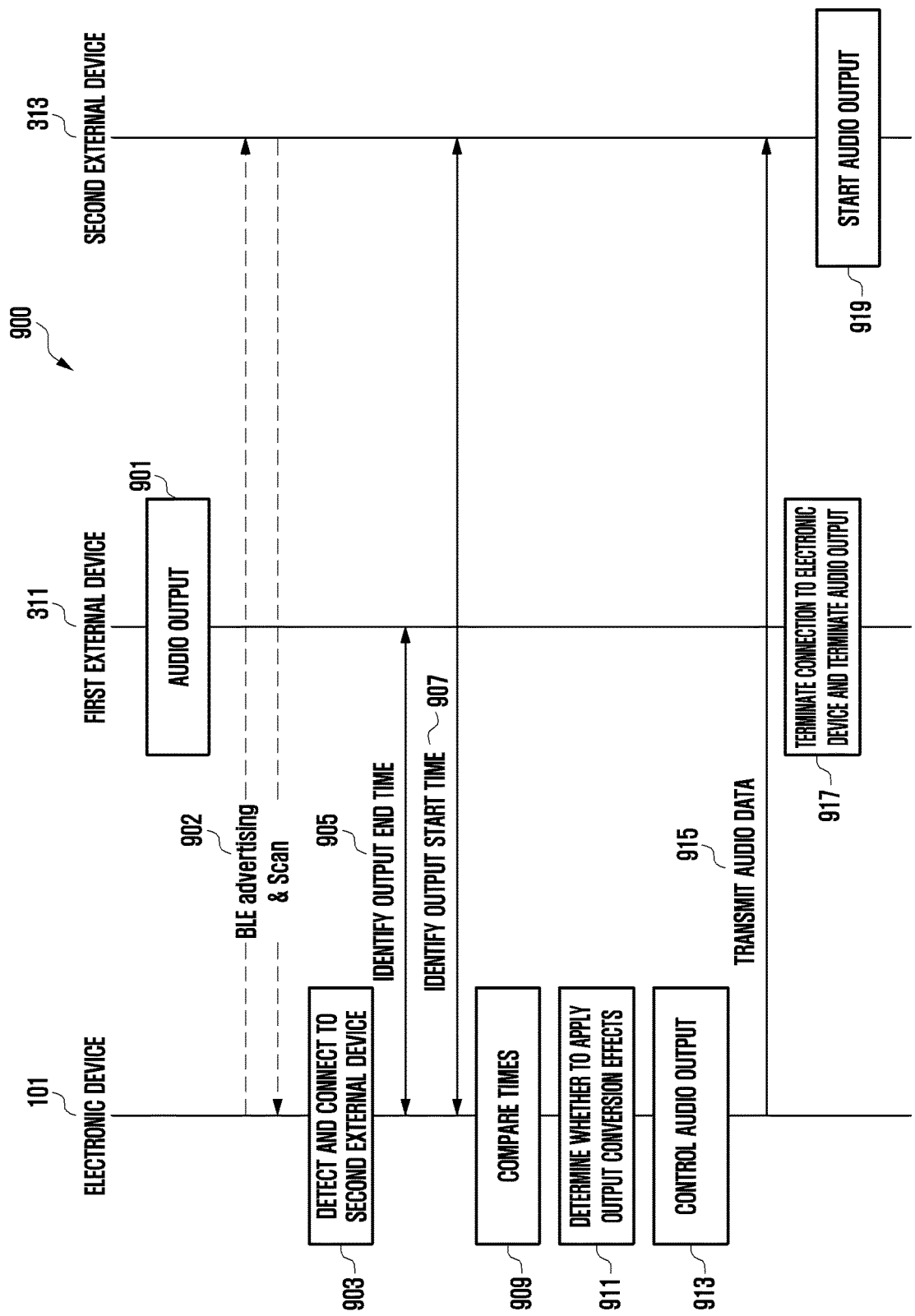
FIG. 9 is a flowchart illustrating a method of controlling audio output conversion between external devices by an electronic device according to an embodiment.

FIG. 9 is a flowchart 900 illustrating a method of controlling audio output conversion between external devices by an electronic device according to an embodiment.

Referring to FIG. 9, in operation 901, the first external device 311 may provide audio output. The first external device 311 may be connected to the electronic device 101 via a communication module (e.g., the communication module 190 of FIG. 1) in order to provide audio output, and may receive audio data from the electronic device 101.

In operation 902, the electronic device 101 may perform advertisement packet broadcasting and scanning via wireless communication (e.g., BLE). The electronic device 101 may or may not perform operation 902 depending on the connection type of the external device 310. The electronic device 101 may receive a response packet from the second external device 313 in association with the advertisement packet broadcasted in operation 902. According to an embodiment, if the external device 310 is a wired device, such as the third external device 315, the electronic device 101 may omit operation 902, and if a connection part of the third external device 315 is inserted into a connection terminal (e.g., the connection terminal 178 of FIG. 1), the electronic device 101 may detect the third external device 315 and may connect thereto in operation 903.

In operation 903, the electronic device 101 may detect the second external device 313, and may connect to the detected second external device 313. The electronic device 101 may connect to the second external device 313 via the communication module 190. The electronic device 101 may exchange information with the second external device 313. The exchanged information may be profile information associated with the electronic device 101 or the second external device 313, and may include, for example, device identifier, device name, or additional information. If the electronic device 101 is connected to the second external device 313, a communication protocol for transmitting audio data or a command protocol for controlling audio output may be used (or configured) between the electronic device 101 and the second external device 313. The operation of connecting to the second external device 313 may be performed after detecting the second external device 313 and before performing operation 911.

In operation 905, the electronic device 101 may identify the output end time of the first external device 311. The output end time of the first external device 311 may be the point in time at which audio output via the first external device 311 is ended. If the electronic device 101 detects or connects to the second external device 313, the electronic device 101 may identify the output end time of the first external device 311.

In operation 907, the electronic device 101 may identify the output start time of the second external device 313. The electronic device 101 may identify the connection time or the output start time of the second external device 313 and may store the same in a memory (e.g., the memory 130 of FIG. 1) in operation 903. The connection time may be the point in time at which the electronic device 101 is connected to the second external device 313, and the output start time may be the point in time at which audio output via the second external device 313 is enabled.

In operation 909, the electronic device 101 may compare the times. The electronic device 101 may compare the output end time of the first external device 311 and the output start time of the second external device 313.

In operation 911, the electronic device 101 may determine whether to apply output conversion effects. For example, the electronic device 101 may determine whether the output start time of the second external device 313 falls within a predetermined period of time from the output end time of the first external device 311. If the output start time of the second external device 313 falls within a predetermined period of time from the output end time of the first external device 311, the electronic device 101 may determine to apply output conversion effects to audio output via the second external device 313. Alternatively, if the output start time of the second external device 313 is beyond the predetermined period of time from the output end time of the first external device 311, the electronic device 101 may determine not to apply output conversion effects to audio output via the second external device 313.

In operation 913, the electronic device 101 may control audio output based on the determination. The electronic device 101 may apply fade-out effects to the audio output via the first external device 311 based on the connection time or the output end time. The electronic device 101 may apply fade-in effects to the audio output via the second external device 313 based on the connection time or the output end time. The electronic device 101 may terminate the connection to the first external device 311, and to provide audio output via the second external device 313.

In operation 915, the electronic device 101 may transmit audio data to the second external device 313. The electronic device 101 may not transmit audio data to the first external device 311, and may transmit audio data to the second external device 313.

In operation 917, the first external device 311 may terminate the connection to the electronic device 101, and may terminate audio output. The first external device 311 may terminate audio output at the output end time.

In operation 919, the second electronic device 313 may start audio output. The second external device 313 may start audio output at the output start time. Alternatively, the second external device 313 may start audio output a predetermined period of time after the output end time.

Although operations 913 to 919 are illustrated as separate operations in the drawing for ease of description, operations 913 to 919 may be performed in parallel. According to an embodiment, the electronic device 101 may apply fade-out effects to audio output via the first external device 311 while performing operations 913 to 919, may transmit audio data to the second external device 313, and may apply fade-in effects to audio output via the second external device 313.

Figure 10:
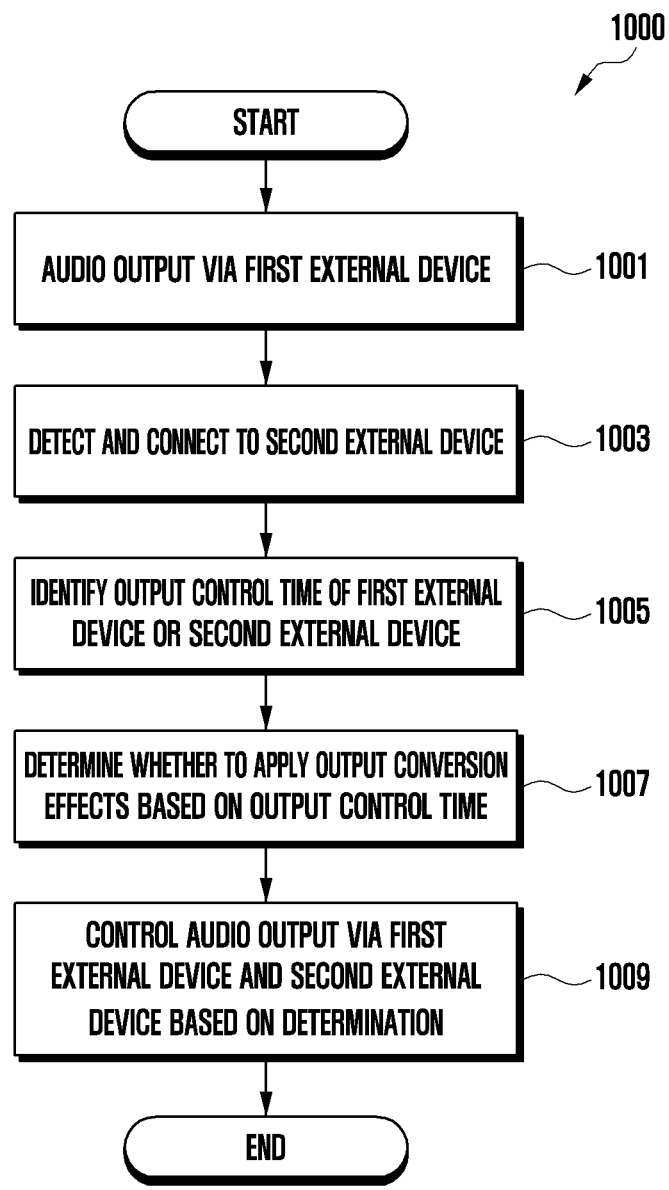
FIG. 10 is a flowchart illustrating a method of controlling audio output conversion between external devices by an electronic device according to an embodiment.

FIG. 10 is a flowchart 1000 illustrating a method of controlling audio output conversion between external devices by an electronic device according to an embodiment.

Referring to FIG. 10, in operation 1001, a processor (e.g., the processor 120 of FIG. 1) of an electronic device (e.g., the electronic device 101) according to an embodiment may provide audio output via the first external device (e.g., the external device 311 of FIG. 3B). For example, the processor 120 may run a music reproduction application based on a user input, thereby reproducing music. The processor 120 may transmit audio data corresponding to the reproduced music to the first external device 311 via a communication module (e.g., the communication module 190 of FIG. 1). The first external device 311 may be connected to the electronic device 101 via the communication module 190, and may output audio data received from the electronic device 101. Although descriptions of FIG. 10 are provided using the first external device 311 as an example for ease of description, the electronic device 101 may provide audio output via the second external device 313. According to an embodiment, if the processor 120 is connected to the first external device 311, the processor may produce an output adjustment object (e.g., a second output adjustment object) of the first external device 311, separately from an output adjustment object (e.g., a first output adjustment object) of the electronic device 101, and may store the same in a memory (e.g., the memory 130 of FIG. 1).

In operation 1003, the processor 120 may detect a second external device (e.g., the second external device 313 of FIG. 3B), and may connect to the second external device 313. The processor 120 may terminate the connection to the first external device 311, and may connect to the second external device 313 via the communication module 190. If the connection to the first external device 311 is terminated, the processor 120 may terminate audio output via the first external device 311. If the processor 120 detects the second external device 313 or is connected to the second external device 313, the processor 120 may store the output end time of the first external device 311, the connection time of the second external device 313, and/or the output start time of the second external device 313 in the memory 130. Operation 1003 is the same as, or similar to, operation 505 of FIG. 5, and thus, detailed descriptions thereof may be omitted.

According to an embodiment, if the processor 120 is connected to the second external device 313, the processor 120 may produce an output adjustment object (e.g., a third output adjustment object) of the second external device 313, separately from the output adjustment object of the electronic device 101, and may store the same in the memory 130. The processor 120 may manage the output adjustment object of the second external device 313 based on the volume control information of the second external device 313. For example, if the volume adjustment of the volume control information is activated (or turned on), the electronic device 101 may change the volume of the electronic device 101 to the highest volume, and may store the output adjustment object of the second external device 313 based on the changed volume of the electronic device 101. If the volume adjustment of the volume control information is deactivated (or turned off), or the volume control information is not obtained, the electronic device 101 may store the output adjustment object of the second external device 313 based on the volume of the electronic device 101.

In operation 1005, the processor 120 may identify the output control time of the first external device 311 or the second external device 313. The output control time may include the output end time of the first external device 311 or the output start time of the second external device 313. The output control time may further include the connection time of the second external device 313. Although operations 1003 and 1005 are illustrated as separate operations in the drawing, operations 1003 and 1005 may be performed in parallel. For example, the processor 120 may proceed with operation 1005, while operating operation 1003.

In operation 1007, based on the output control time, the processor 120 may determine whether to apply output conversion effects. For example, if the output start time of the second external device 313 falls within a predetermined period of time from the output end time of the first external device 311, the processor 120 may determine to apply output conversion effects to audio output via the second external device 313. Alternatively, if the output start time of the second external device 313 is beyond the predetermined period of time from the output end time of the first external device 311, the electronic device 101 may determine not to apply output conversion effects to audio output via the second external device 313.

In operation 1009, the processor 120 may control audio output via the first external device 311 and the second external device 313 based on the determination. Based on the determination, the processor 120 may or may not apply fade-in effects to the audio output via the second external device 313. According to an embodiment, the processor 120 may apply fade-out effects to audio output via the first external device 311 based on the output end time of the first external device 311 or the connection time of the second external device 313, and may apply fade-in effects to audio output via the second external device 313 based on the output end time of the first external device 311 or the output start time of the second external device 313. The processor 120 may apply fade-in effects to the audio output via the second external device 313 based on the volume control information of the second external device 313.

According to an embodiment, the processor 120 may apply fade-out effects to the volume of the first external device 311 using the output adjustment object of the first external device 311, and may apply fade-in effects to the volume of the second external device 313 using the output adjustment object of the second external device 313.

Figure 11A:
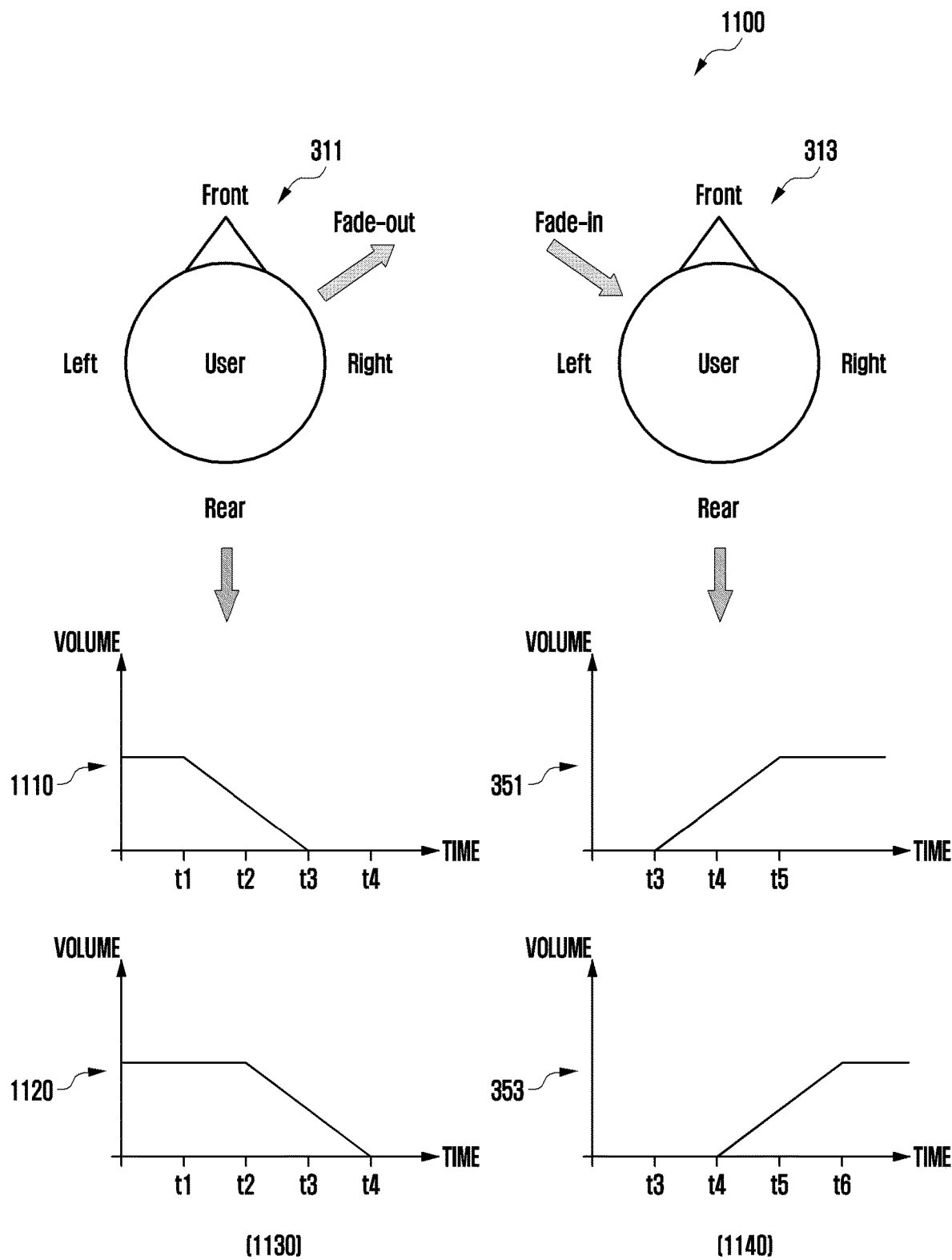
FIG. 11A is a diagram illustrating an audio output control graph showing audio output control of an electronic device and external devices over time according to an embodiment.
Figure 11B:
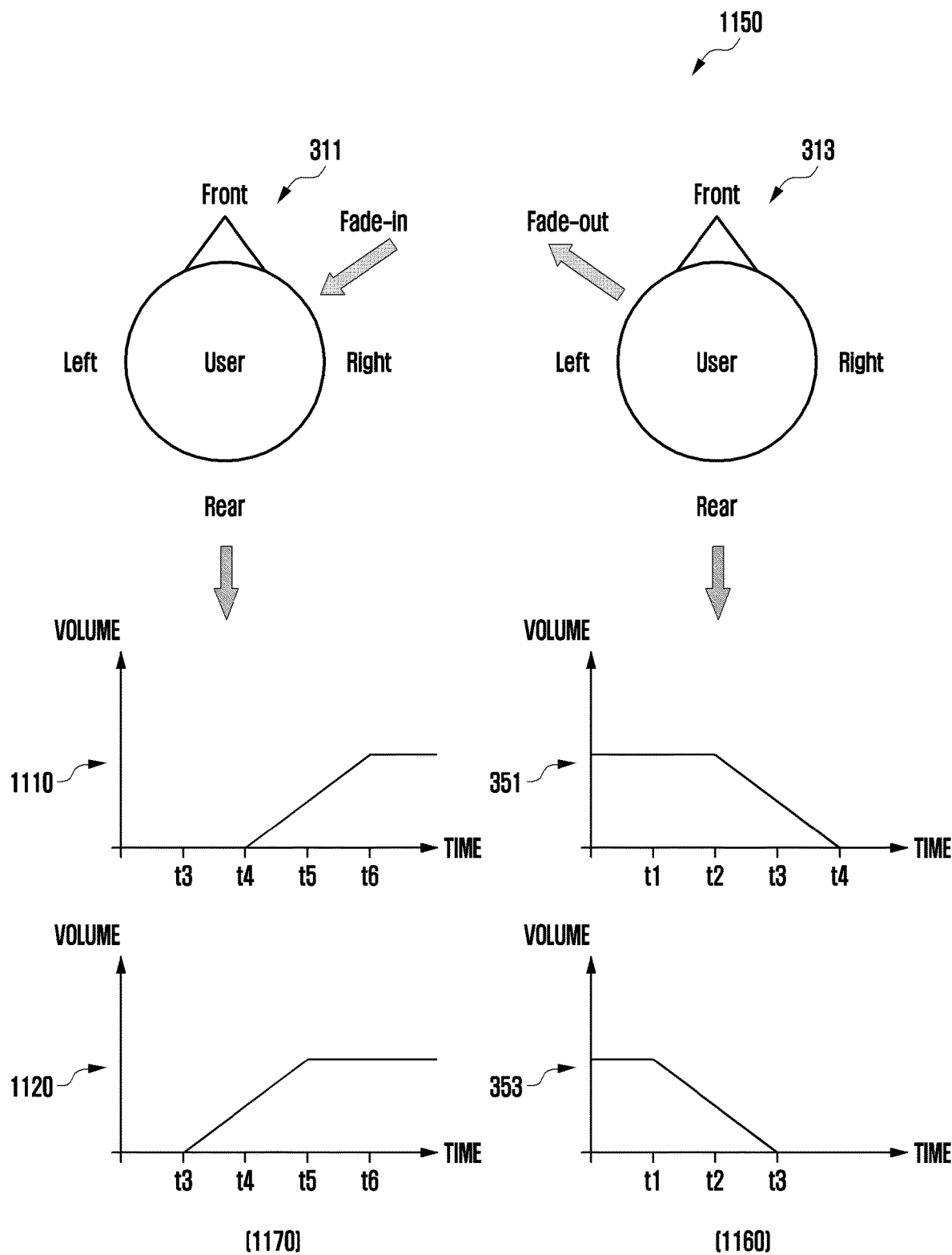
FIG. 11B is a diagram illustrating an audio output control graph showing audio output control of an electronic device and external devices over time according to another embodiment.
Figure 11C:
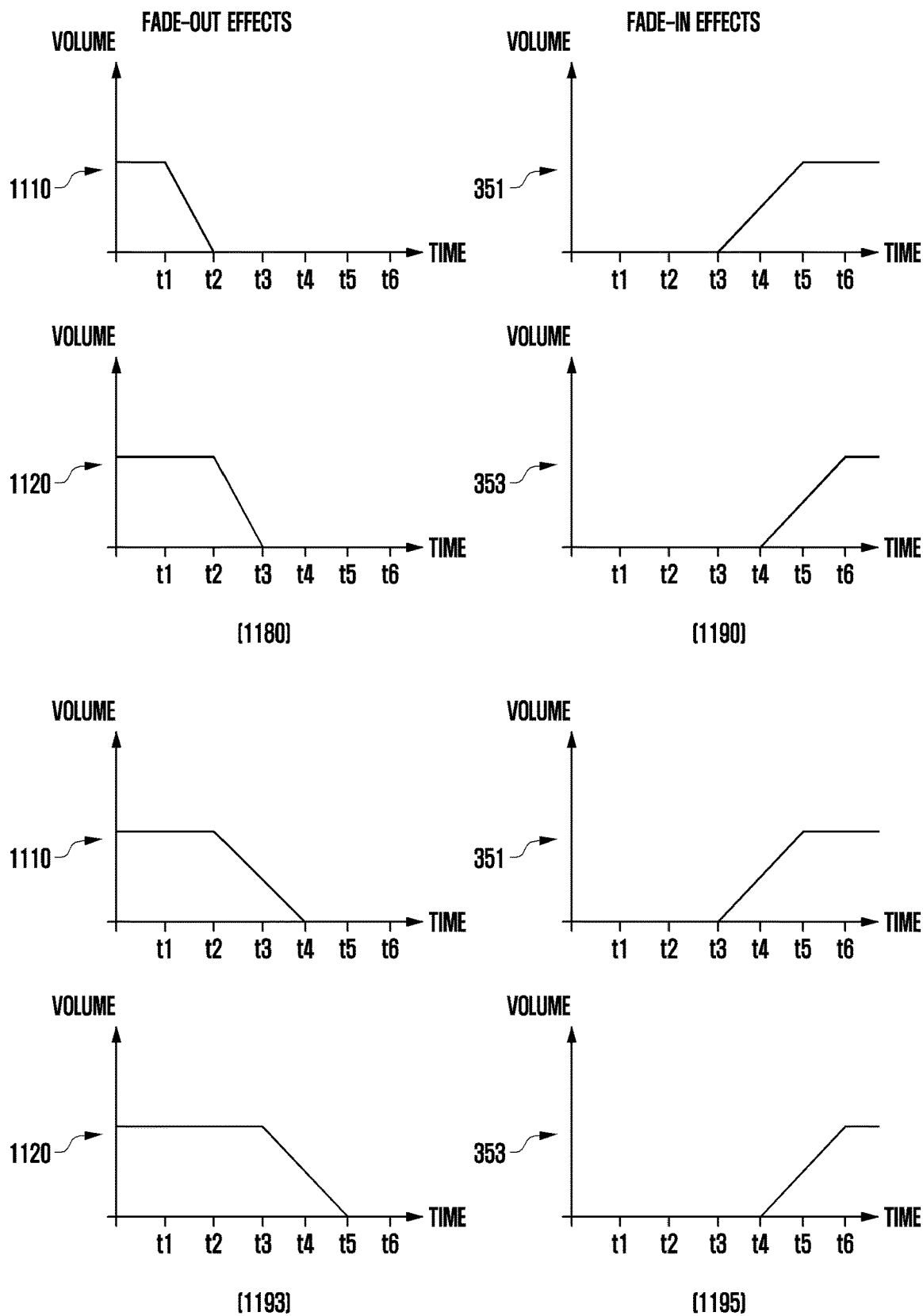
FIG. 11C is a diagram illustrating an audio output control graph showing audio output control of an electronic device and external devices over time according to certain embodiments.

FIG. 11A is a diagram illustrating an audio output control graph showing audio output control of an electronic device and external devices over time according to an embodiment, FIG. 11B is a diagram illustrating an audio output control graph showing audio output control of an electronic device and external devices over time according to another embodiment, and FIG. 11C is a diagram illustrating an audio output control graph showing audio output control of an electronic device and external devices over time according to certain embodiments.

FIG. 11A is a diagram illustrating a network environment 1100 in which an electronic device connected to a first external device detects the connection of a second external device.

Referring to FIG. 11A, an electronic device (e.g., the electronic device 101 of FIG. 1) according to an embodiment may detect the second external device 313 while providing audio output via the first external device 311. If the electronic device 101 detects the connection of the second external device 313, which is a new external device, while providing audio output via the first external device 311, which was connected earlier, the electronic device 101 may terminate the connection to the first external device 311.

A first audio output control graph 1130 and a second audio output control graph 1140 may show an example of applying output conversion effects over time if the second external device 313 is detected or is connected (e.g., at first time (t1)) while audio output is being provided via the first external device 311 (e.g., before the first time (t1)). The first time (t1) may be the point in time at which the electronic device 101 detects the second external device 313, or the point in time (e.g., a connection time) at which the electronic device 101 connects to the second external device 313. The second time (t2) may be the point in time at which audio output via the first external device 311 is terminated (e.g., an output end time). The third time (t3) may be the point in time at which audio output via the second external device 313 is enabled (e.g., an output start time). Alternatively, the third time (t3) may be the output end time, and the fourth time (t4) may be the output start time. The fifth time (t5) may be the point in time after a first predetermined period of time from the fourth time (t4). The sixth time (t6) may be the point in time after a second predetermined period of time from the fifth time (t5). The lengths of the first predetermined period of time and the second predetermined period of time may be the same as, or different from, each other. The electronic device 101 may set the fourth time (t4) to the sixth time (t6) based on the first time (t1) to the third time (t3). Alternatively, the fourth time (t4) to the sixth time (t6) may be set by the user of the electronic device 101.

Referring to the first audio output control graph 1130, the electronic device 101 may apply fade-out effects to audio signals output via the first external device 311, from the first time (t1). For example, the first external device 311 includes at least two speakers 1110 and 1120, and the first speaker 1110 may be the left speaker and the second speaker 1120 may be the right speaker. The electronic device 101 may apply fade-out effects to audio signals output via the first speaker 1110 during the time interval from the first time (t1) to the third time (t3), and may apply fade-out effects to audio signals output via the second speaker 1120 during the time interval from the second time (t2) to the fourth time (t4). The electronic device 101 may apply fade-out effects to audio signals output via the first external device 311 in a left (e.g., the first speaker 1110) to right (e.g., the second speaker 1120) direction.

According to an embodiment, if the electronic device 101 is connected to the first external device 311, the electronic device 101 may produce an output adjustment object of the first speaker 1110 or an output adjustment object of the second speaker 1120, and may store the same in the memory 130. The electronic device 101 may apply fade-out effects to the volume of the first speaker 1110 using the output adjustment object of the first speaker 1110 during the time interval from the first time (t1) to the third time (t3), and may apply fade-out effects to the volume of the second speaker 1120 using the output adjustment object of the second speaker 1120 during the time interval from the second time (t2) to the fourth time (t4).

Referring to the second audio output control graph 1140, the electronic device 101 may apply fade-in effects to audio signals output via the second external device 313, from the third time (t3). For example, the second external device 313 includes at least two output devices 351 and 353, and the first device 351 may be the left output device and the second device 353 may be the right output device. The electronic device 101 may apply fade-in effects to audio signals output via the first device 351 during the time interval from the third time (t3) to a fifth time (t5), and may apply fade-in effects to audio signals output via the second device 353 during the time interval from the fourth time (t4) to the sixth time (t6). The electronic device 101 may apply fade-in effects to audio signals output via the second external device 313 in a left (e.g., the first device 351) to right (e.g., the second device 353) direction.

According to an embodiment, if the electronic device 101 is connected to the second external device 313, the electronic device 101 may produce an output adjustment object of the first device 351 or an output adjustment object of the second device 353, and may store the same in the memory 130. The electronic device 101 may apply fade-in effects to the volume of the first device 351 using the output adjustment object of the first device 351 during the time interval from the third time (t3) to the fifth time (t5), and may apply fade-in effects to the volume of the second device 353 using the output adjustment object of the second device 353 during the time interval from the fourth time (t4) to the sixth time (t6).

According to an embodiment, the electronic device 101 may apply fade-out effects to audio signals output via the first external device 311, and immediately, may apply fade-in effects to audio signals output via the second external device 313.

FIG. 11B is a diagram illustrating another network environment 1150 in which an electronic device connected to a second external device detects the connection of a first external device.

Referring to FIG. 11B, the electronic device 101 may detect the first external device 311 while providing audio output via the second external device 313. If the electronic device 101 detects the connection of the first external device 311, which is a new external device, while providing audio output via the second external device 313 which was connected earlier, the electronic device 101 may terminate the connection to the second external device 313.

A third audio output control graph 1160 and a fourth audio output control graph 1170 may show an example of applying output conversion effects over time if the first external device 311 is detected or is connected (e.g., at first time (t1)) while audio output is being provided via the second external device 313 (e.g., before the first time (t1)). The descriptions of the first time (t1) to a sixth time (t6) are the same as those described in FIG. 11A, and thus, detailed descriptions thereof will be omitted.

Referring to the third audio output control graph 1160, the electronic device 101 may apply fade-out effects to audio signals output via the second external device 313, from the first time (t1). For example, the electronic device 101 may apply fade-out effects to audio signals output via the second device 353 during the time interval from the first time (t1) to a third time (t3), and may apply fade-out effects to audio signals output via the first device 351 during the time interval from a second time (t2) to a fourth time (t4). The electronic device 101 may apply fade-out effects to audio signals output via the second device 313 in a right (e.g., the second device 353) to left (e.g., the first device 351) direction.

According to an embodiment, the electronic device 101 may apply fade-out effects to the volume of the second device 353 using the output adjustment object of the second device 353 during the time interval from the third time (t3) to a fifth time (t5), and may apply fade-out effects to the volume of the first device 351 using the output adjustment object of the first device 351 during the time interval from the second time (t2) to the fourth time (t4).

Referring to the fourth audio output control graph 1170, the electronic device 101 may apply fade-in effects to audio signals output via the first external device 311, from the third time (t3). For example, the electronic device 101 may apply fade-in effects to audio signals output via the second speaker 1120 during the time interval from the third time (t3) to a fifth time (t5), and may apply fade-in effects to audio signals output via the first speaker 1110 during the time interval from the fourth time (t4) to a sixth time (t6). The electronic device 101 may apply fade-in effects to audio signals output via the first external device 311 in a right (e.g., the second speaker 1120) to left (e.g., the first speaker 1110) direction.

According to an embodiment, the electronic device 101 may apply fade-in effects to the volume of the second speaker 1120 using the output adjustment object of the second speaker 1120 during the time interval from the third time (t3) to the fifth time (t5), and may apply fade-in effects to the volume of the first speaker 1110 using the output adjustment object of the first speaker 1110 during the time interval from the fourth time (t4) to the sixth time (t6).

FIG. 11C is a diagram illustrating various embodiments of applying output conversion effects.

Referring to FIG. 11C, the electronic device 101 may detect the second external device 313 (e.g., the first device 351 and the second device 353) while providing audio output via the first external device 311 (e.g., the first speaker 1110 and the second speaker 1120). If the electronic device 101 detects the connection of the second external device 313, which is a new external device, while providing audio output via the first external device 311 which was connected earlier, the electronic device 101 may terminate the connection to the first external device 311. The descriptions of the first time (t1) to a sixth time (t6) are the same as those described in FIG. 11A, and thus, detailed descriptions thereof will be omitted.

A first audio output control graph 1180 and a second audio output control graph 1190 may show an example of applying fade-out effects to the volume of the first external device 311, and, after a predetermined period time elapses, applying fade-in effects to the volume of the second external device 313. Referring to the first audio output control graph 1180, the electronic device 101 may apply fade-out effects to the volume of the first speaker 1110 using the output adjustment object of the first speaker 1110 during the time interval from the first time (t1) to the second time (t2), and may apply fade-out effects to the volume of the second speaker 1120 using the output adjustment object of the second speaker 1120 during the time interval from the second time (t2) to the third time (t3).

Referring to the second audio output control graph 1190, the electronic device 101 may apply fade-in effects to the volume of the first device 351 using the output adjustment object of the first device 351 during the time interval from the third time (t3) to the fifth time (t5), and may apply fade-in effects to the volume of the second device 353 using the output adjustment object of the second device 353 during the time interval from the fourth time (t4) to the sixth time (t6).

A third audio output control graph 1193 and a fourth audio output control graph 1195 may show an example of partially overlapping the time interval for applying fade-out effects to the volume of the first external device 311, and the time interval for applying fade-in effects to the volume of the second external device 313. Referring to the third audio output control graph 1193, the electronic device 101 may apply fade-out effects to the volume of the first speaker 1110 using the output adjustment object of the first speaker 1110 during the time interval from the second time (t2) to the fourth time (t4), and may apply fade-out effects to the volume of the second speaker 1120 using the output adjustment object of the second speaker 1120 during the time interval from the third time (t3) to the fifth time (t5).

Referring to the fourth audio output control graph 1195, the electronic device 101 may apply fade-in effects to the volume of the first device 351 using the output adjustment object of the first device 351 during the time interval from the third time (t3) to the fifth time (t5), and may apply fade-in effects to the volume of the second device 353 using the output adjustment object of the second device 353 during the time interval from the fourth time (t4) to the sixth time (t6).

The interval in which the first speaker 1110 provides audio output and the interval in which the first device 351 provides audio output may overlap from the third time (t3) to the fourth time (t4). In addition, the interval in which the second speaker 1120 provides audio output and the interval in which the second device 353 provides audio output may overlap from the fourth time (t4) to the fifth time (t5).

Figure 12:
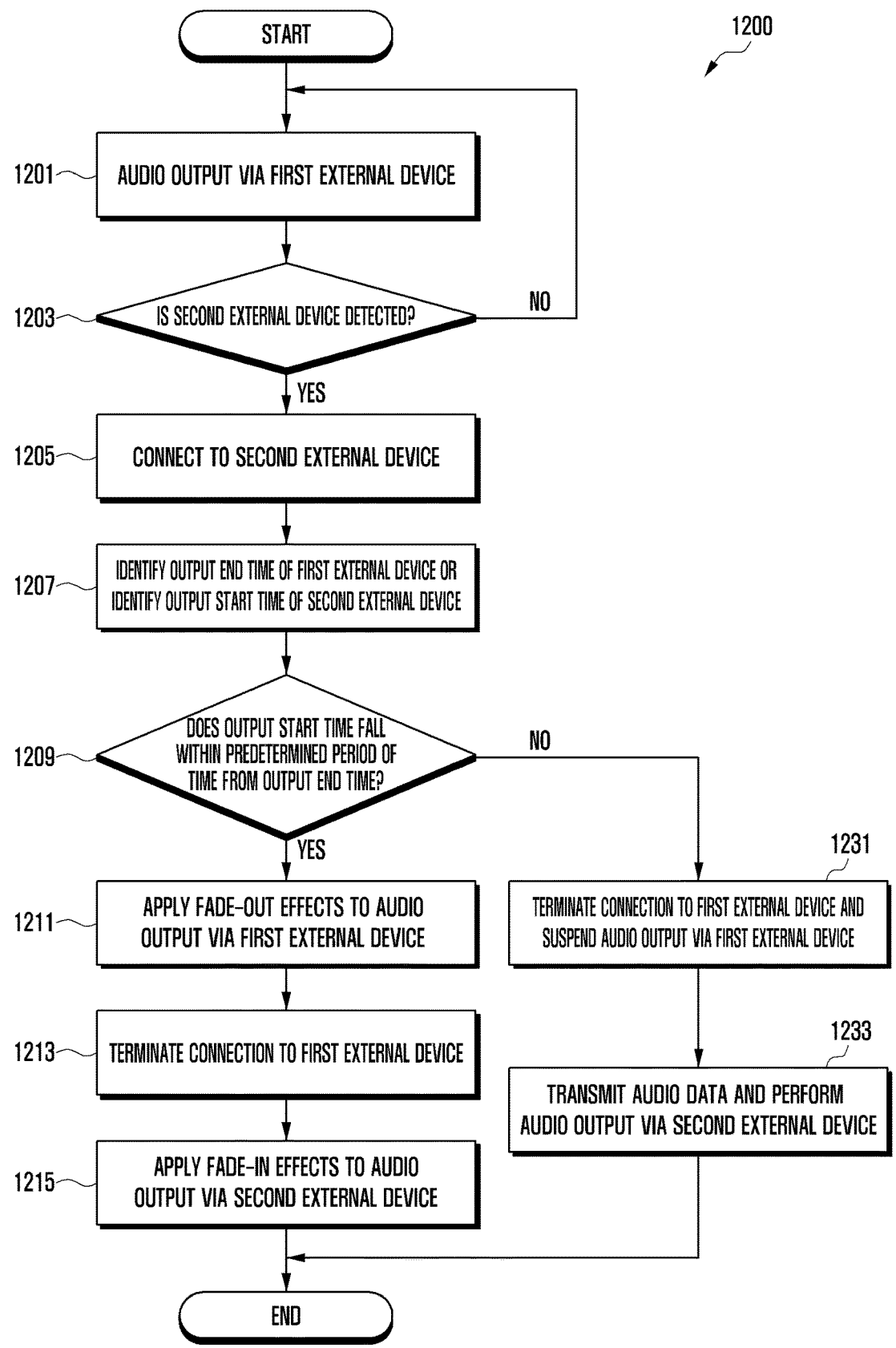
FIG. 12 is a flowchart illustrating a method of controlling audio output conversion between external devices by an electronic device according to an embodiment.

FIG. 12 is a flowchart 1200 illustrating a method of controlling audio output conversion between external devices by an electronic device according to an embodiment.

Referring to FIG. 12, in operation 1201, a processor (e.g., the processor 120 of FIG. 1) of an electronic device (e.g., the electronic device 101) according to an embodiment may provide audio output via a first external device (e.g., the external device 311 of FIG. 3B). The processor 120 may transmit audio data corresponding to reproduce music to the first external device 311 via a communication module (e.g., the communication module 190 of FIG. 1). The first external device 311 may be connected to the electronic device 101 via the communication module 190, and may output audio data received from the electronic device 101. According to an embodiment, if the processor 120 is connected to the first external device 311, the electronic device 101 may produce an output adjustment object of the first external device 311, separately from an output adjustment object of the electronic device 101, and may store the same in a memory (e.g., the memory 130 of FIG. 1). Operation 1201 is the same as, or similar to, operation 1001 of FIG. 10, and thus, detailed descriptions thereof may be omitted.

In operation 1203, the processor 120 may detect a second external device (e.g., the second external device 313 of FIG. 3B). The processor 120 may broadcast an advertisement packet via the communication module 190, and may receive a response packet from the second external device 313 in association with the advertisement packet, thereby detecting the second external device 313. If the second external device 313 is detected, the processor 120 may proceed with operation 1205. If the second external device 313 is not detected, the processor 120 may return to operation 1201. If the second external device 313 is not detected, the processor 120 may return to operation 1201 and may output audio signals via the first external device 311.

If the second external device 313 is detected, the processor 120 may connect to the second external device 313 in operation 1205. If the processor 120 is connected to the second external device 313, the processor 120 may store the output end time of the first external device 311, the connection time of the second external device 313, and/or the output start time of the second external device 313 in the memory 130. According to an embodiment, if the processor 120 is connected to the second external device 313, the processor 120 may produce an output adjustment object of the second external device 313, separately from the output adjustment object of the electronic device 101, and may store the same in the memory 130. Operation 1205 is the same as, or similar to, operation 505 of FIG. 5, and thus, detailed descriptions thereof may be omitted.

In operation 1207, the processor 120 may identify the output end time of the first external device 311 or the output start time of the second external device 313. The processor 120 may compare the output end time and the output start time.

In operation 1209, the processor 120 may determine whether the output start time falls within a predetermined period of time from the output end time. If the output start time falls within a predetermined period of time from the output end time, the processor 120 may proceed with operation 1211. If the output start time is beyond the predetermined period of time from the output end time, the processor 120 may proceed with operation 1231.

If the output start time falls within the predetermined period of time from the output end time, the processor 120 may apply fade-out effects to audio output via the first external device 311 in operation 1211. The processor 120 may apply fade-out effects to audio output via the first external device 311, based on the output end time of the first external device 311 or the connection time of the second external device 313. For example, the processor 120 may apply fade-out effects to the audio output via the first external device 311 from the connection time until the output end time. According to an embodiment, the processor 120 may apply fade-out effects to the volume of the first external device 311 using the output adjustment object of the first external device 311.

In operation 1213, the processor 120 may terminate the connection to the first external device 311. While performing operation 1211, the processor 120 may transmit audio data to the first external device 311. In operation 1213, the processor 120 may terminate the connection of the first external device 311, and may change its audio data transmission device to the second external device 313. The processor 120 may change the audio data transmission device to the second external device 313, and may transmit audio data to the second external device 313.

In operation 1215, the processor 120 may apply fade-in effects to audio output via the second external device 313. The processor 120 may apply fade-in effects to audio output via the second external device 313, based on the output end time or the output start time. For example, the processor 120 may apply fade-in effects to audio output via the second external device 313 at the output start time. Alternatively, the processor 120 may suspend audio output during a predetermined period of time after the output end time, and after the predetermined period of time elapses (e.g., after the output start time), the processor 120 may apply fade-in effects to audio output via the second external device 313. According to an embodiment, the processor 120 may apply fade-in effects to the volume of the second external device 313 using the output adjustment object of the second external device 313.

In the drawing, although operations 1211 to 1215 are illustrated as separate operations, operations 1211 to 1215 may be performed in parallel. Alternatively, some of operations 1211 to operation 1215 may be performed in parallel. For example, the processor 120 may apply fade-out effects to audio output via the first external device 311, and may apply fade-in effects to audio output via the second device 313, while transmitting audio data to the second external device 313 (e.g., operation 1213). The processor 120 may perform operation 1211 of applying fade-out effects and operation 1215 of applying fade-in effects, partially in parallel.

If the output start time is beyond the predetermined period of time from the output end time, the processor 120 may terminate the connection to the first external device 311, and may suspend audio output via the first external device 311 in operation 1231. If there is a large difference (e.g., at least three seconds) between the output end time and the output start time, the processor 120 may not apply fade-out effects to audio output via the first external device 311, and may suspend audio output.

In operation 1233, the processor 120 may transmit audio data to the second external device 313, and may provide audio output via the second external device 313. The processor 120 may not apply output conversion effects (e.g., fade-in effects) to audio output via the second external device 313, and may provide audio output via the second external device 313.

An operation method of an electronic device (e.g., the electronic device 101 of FIG. 1) according to an embodiment may include: detecting an external device; identifying the connection type of the detected external device; identifying whether audio is output via a speaker of the electronic device; determining whether to apply output conversion effects based on the connection type of the detected external device and/or whether the audio is output via the speaker; and controlling audio output via the external device based on the determination.

The operation of determining may include: determining to apply the output conversion effects when the external device is detected while the audio is output via the speaker; or determining not to apply the output conversion effects when the external device is detected while the audio is not output via the speaker.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The embodiments of the disclosure described and shown in the specification and the drawings have been presented to easily explain the technical contents of the disclosure and help understanding of the disclosure, and are not intended to limit the scope of the disclosure. Therefore, the scope of the disclosure should be construed to include, in addition to the embodiments disclosed herein, all changes and modifications derived on the basis of the technical idea of the disclosure.

What is claimed is:

1. An electronic device comprising:
   a speaker;

a memory; and a processor operatively connected to the speaker and the memory, wherein the processor is configured to:

detect an external device;

identify a connection type of the external device;

identify whether audio is output via the speaker;

when the external device is a wireless device, obtain volume control information from the external device;

store a connection time or an output start time of the external device in the memory;

determine whether to apply output conversion effects based on the volume control information or whether the audio is output via the speaker;

when the volume control information is not obtained before the output start time, determine not to apply the output conversion effects; and control, based on the determination, output of the audio via the external device.

2. The electronic device of claim 1, wherein the processor is further configured to:

determine to apply the output conversion effects when the external device is detected while the audio is output via the speaker; and determine not to apply the output conversion effects when the external device is detected while the audio is not output via the speaker.

3. The electronic device of claim 1, wherein the processor is further configured to:

when the external device is a wired device, determine whether to apply the output conversion effects based on whether the audio is output via the speaker.

4. The electronic device of claim 1, wherein the processor is further configured to apply fade-in effects to the audio output via the external device based on the output start time when it is determined that the output conversion effects is to be applied.

5. The electronic device of claim 4, wherein, applying the fade-in effects further comprises changing volume of the audio gradually from a lowest volume to a highest volume or to a predetermined volume.

6. The electronic device of claim 1, wherein the processor is further configured to:

apply fade-out effects to the audio output via the speaker based on the connection time; and apply fade-in effects to the audio output via the external device based on the output start time when it is determined that the output conversion effects is to be applied.

7. The electronic device of claim 6, applying the fade-out effects further comprises changing a volume of the audio gradually from a highest volume or to a predetermined volume to a lowest volume.

8. The electronic device of claim 6, wherein the processor is further configured to:

apply the fade-in effects for a predetermined period of time after applying the fade-out effects; or apply the fade-in effects immediately after applying the fade-out effects.

9. The electronic device of claim 1, wherein the processor is further configured to:

when the volume control information is not obtained before the output start time from the external device while the audio is output via the speaker, suspend the output of the audio via the speaker; and transmit audio data to the external device without applying the output conversion effects to the audio to be output via the external device.

10. The electronic device of claim 1, wherein the processor is further configured to:

store an output adjustment object of the electronic device in the memory as a first output adjustment object;

produce an output adjustment object of the external device when the processor is connected to the wireless device;

store the output adjustment object of the external device in the memory as a second output adjustment object; and apply the output conversion effects to the audio outputted via the speaker using the first output adjustment object, or apply the output conversion effects to the audio outputted via the external device using the second output adjustment object.

11. The electronic device of claim 1, wherein the processor is further configured to:

detect another external device while the audio is output via the external device;

identify an output control time of the external device or the another external device; and determine whether to apply the output conversion effects based on the output control time.

12. The electronic device of claim 11, wherein the output control time further comprises:

an output end time of the external device and/or an output start time of the another external device, and wherein the processor is further configured to:

determine to apply the output conversion effects when the output start time falls within a predetermined period of time from the output end time; and determine not to apply the output conversion effects when the output start time is beyond the predetermined period of time from the output end time.

13. The electronic device of claim 12, wherein the processor is further configured to:

when the processor is connected to the another external device, store a connection time and/or the output start time of the another external device in the memory;

when it is determined to apply the output conversion effects, apply fade-out effects to the audio output via the external device based on the output end time and/or the connection time; and apply fade-in effects to the audio output via the another external device, based on the output end time and/or the output start time.

14. The electronic device of claim 13, wherein the processor is further configured to:

apply the fade-in effects for another predetermined period of time after applying the fade-out effects;

apply the fade-in effects immediately after applying the fade-out effects; or partially overlap an interval for applying the fade-out effects and an interval for applying the fade-in effects.

15. The electronic device of claim 13, wherein the processor is further configured to:

when the external device is configured with at least a first device and a second device, apply the fade-out effects to the first device at the connection time, and apply the fade-out effects to the second device for another predetermined period of time after the connection time.

16. The electronic device of claim 13, wherein the processor is further configured to:

when the another external device is configured with at least a third device and a fourth device, apply the fade-in effects to the third device at the output start time, and apply the fade-in effects to the fourth device for another predetermined period of time after the output start time.

17. The electronic device of claim 11, wherein the processor is further configured to:
store an output adjustment object of the electronic device in the memory as a first output adjustment object;
produce an output adjustment object of the external device when the processor is connected to the external device;
store the output adjustment object of the external device in the memory as a second output adjustment object;
produce an output adjustment object of the another external device when the processor is connected to the another external device;
store the output adjustment object of the another external device in the memory as a third output adjustment object; and
apply the output conversion effects to the audio outputted via the external device using the second output adjustment object, or apply the output conversion effects to the audio outputted via the another external device using the third output adjustment object.

18. An operation method of an electronic device, the method comprising:
detecting an external device;
identifying a connection type of the detected external device;
identifying whether audio is output via a speaker of the electronic device;
when the external device is a wireless device, obtaining volume control information from the external device;
storing a connection time or an output start time of the external device in memory;
determining whether to apply output conversion effects based on the volume control information or whether the audio is output via the speaker;
when the volume control information is not obtained before the output start time, determining not to apply the output conversion effects; and
controlling audio output via the external device based on the determination.

19. The method of claim 18, wherein the determining comprises:
determining to apply the output conversion effects when the external device is detected while the audio is output via the speaker; or
determining not to apply the output conversion effects when the external device is detected while the audio is not output via the speaker.

* * * * *